(12) United States Patent
Schaefer et al.

(10) Patent No.: US 11,089,021 B2
(45) Date of Patent: *Aug. 10, 2021

(54) PRIVATE NETWORK LAYERING IN PROVIDER NETWORK ENVIRONMENTS

(71) Applicant: Amazon Technologies, Inc., Seattle, WA (US)

(72) Inventors: Edward Max Schaefer, Falls Church, VA (US); Upendra Bhalchandra Shevade, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/277,379

(22) Filed: Feb. 15, 2019

(65) Prior Publication Data

US 2019/0182256 A1 Jun. 13, 2019

Related U.S. Application Data

(63) Continuation of application No. 14/548,196, filed on Nov. 19, 2014, now Pat. No. 10,212,161.

(51) Int. Cl.
*H04L 29/06* (2006.01)
*H04W 12/08* (2021.01)

(52) U.S. Cl.
CPC .......... *H04L 63/10* (2013.01); *H04L 63/0209* (2013.01); *H04L 63/0272* (2013.01); *H04L 63/20* (2013.01); *H04W 12/08* (2013.01)

(58) Field of Classification Search
CPC ......... H04L 63/08; H04L 63/10; H04L 63/20; H04L 63/0209; H04L 63/0272; H04W 12/08
See application file for complete search history.

(56) References Cited

U.S. PATENT DOCUMENTS 6,240,402 B1 5/2001 Lynch-Aird
7,325,140 B2 1/2008 Carley
(Continued)

FOREIGN PATENT DOCUMENTS

EP 1713231 10/2006

OTHER PUBLICATIONS

U.S. Appl. No. 13/239,159, filed on Sep. 21, 2011, Eric J. Brandwine.
(Continued)

*Primary Examiner* — Noura Zoubair
(74) *Attorney, Agent, or Firm* — Robert C. Kowert; Kowert, Hood, Munyon, Rankin & Goetzel, P.C.

(57) ABSTRACT

Methods and apparatus that allow clients to establish sub private networks as resources within private networks on a provider network. A sub private network may be owned and controlled by a different entity than the owner of its parent private network. A parent private network controls access to its sub private networks, and each sub private network also controls access to its resources. This enables a layered topology in which a parent private network may establish access control rules for its sub private networks; the sub private networks may supplement the access control according to their specific needs. Sub private networks may share resources of their parent private network, and a sub private network may allow or restrict access to its resources by its parent private network, by its sibling private networks, and/or by its own sub private network(s).

20 Claims, 15 Drawing Sheets

(56) References Cited

U.S. PATENT DOCUMENTS

| | | | |
|---|---|---|---|
| 7,380,124 B1 | 5/2008 | Mizell et al. | |
| 7,505,962 B2 | 3/2009 | Shariff et al. | |
| 7,779,461 B1 | 8/2010 | Liu et al. | |
| 7,937,438 B1 | 5/2011 | Miller et al. | |
| 7,945,640 B1 | 5/2011 | VanTine | |
| 7,949,785 B2 | 5/2011 | Alkhatib et al. | |
| 7,953,865 B1 | 5/2011 | Miller et al. | |
| 7,991,859 B1 | 8/2011 | Miller et al. | |
| 8,117,289 B1 | 2/2012 | Miller et al. | |
| 8,126,722 B2 | 2/2012 | Robb et al. | |
| 8,131,852 B1 | 3/2012 | Miller et al. | |
| 8,194,680 B1 | 6/2012 | Brandwine et al. | |
| 8,201,237 B1 | 6/2012 | Doane et al. | |
| 8,224,971 B1 | 7/2012 | Miller et al. | |
| 8,230,050 B1* | 7/2012 | Brandwine | H04L 12/4641 |
| | | | 709/220 |
| 8,239,538 B2 | 8/2012 | Zhang et al. | |
| 8,296,820 B2 | 10/2012 | Kao et al. | |
| 8,312,129 B1 | 11/2012 | Brandwine et al. | |
| 8,345,692 B2 | 1/2013 | Smith | |
| 8,352,941 B1 | 1/2013 | Protopopov et al. | |
| 8,402,127 B2 | 3/2013 | Solin | |
| 8,494,481 B2 | 7/2013 | Bacco et al. | |
| 8,625,603 B1 | 1/2014 | Ramakrishnan et al. | |
| 8,644,188 B1 | 2/2014 | Brandwine et al. | |
| 8,924,542 B1 | 12/2014 | Gabrielson et al. | |
| 9,916,545 B1 | 3/2018 | de Kadt et al. | |
| 10,212,161 B1 | 2/2019 | Schaefer et al. | |
| 2003/0084104 A1 | 5/2003 | Salem et al. | |
| 2005/0193103 A1 | 9/2005 | Drabik | |
| 2005/0198244 A1 | 9/2005 | Eilam et al. | |
| 2007/0239987 A1 | 10/2007 | Hoole et al. | |
| 2008/0034200 A1 | 2/2008 | Polcha et al. | |
| 2008/0225875 A1 | 9/2008 | Wray et al. | |
| 2008/0307519 A1 | 12/2008 | Curcio et al. | |
| 2009/0187964 A1* | 7/2009 | Kao | H04L 63/102 |
| | | | 726/1 |
| 2009/0288084 A1 | 11/2009 | Astete et al. | |
| 2010/0057831 A1 | 3/2010 | Williamson | |
| 2010/0115606 A1 | 5/2010 | Samovskiy et al. | |
| 2010/0246443 A1 | 9/2010 | Cohn et al. | |
| 2011/0022694 A1 | 1/2011 | Dalal et al. | |
| 2011/0320598 A1 | 12/2011 | Solin | |
| 2011/0320605 A1 | 12/2011 | Kramer et al. | |
| 2012/0084113 A1 | 4/2012 | Brandwine et al. | |
| 2012/0084443 A1 | 4/2012 | Theimer et al. | |
| 2013/0254868 A1 | 9/2013 | Khasnabish | |
| 2014/0282817 A1 | 9/2014 | Singer et al. | |
| 2014/0325637 A1 | 10/2014 | Zhang | |

OTHER PUBLICATIONS

U.S. Appl. No. 14/582,710, filed on Dec. 24, 2014, Jacob Adam Gabrielson.
U.S. Appl. No. 14/109,535, filed on Dec. 17, 2013, Bashuman Deb.
Amazon Web Services, "Amazon Virtual Private Cloud User Guide", API Version, Jun. 15, 2015, pp. 1-151.
Wikipedia, "Virtual Private Networks," Downloaded Aug. 7, 2013, pp. 1-8.

* cited by examiner

```
<Resource>                              <allow access by>
    <private network 110 default>           <address range(s)>
    private network 120A                    <default>
    private network 120B                    <client network 180>
    resource 112A                           <default>
    resource 112B                           <client network 180 address(es)>
                                            <private network 120A>

```
<Resource>                              <allow access by>
    <private network 120A default>          <address range(s)>
    private network 130                     <default>
    resource 122A1                          <client network 180 address(es)>
                                            <private network 120B address(es)>
    resource 122A2-122A10                   <default>
    resource 122A11                         <client network 180 address(es)>
                                            <private network 120B>
                                            <client private network 110 address(es)>

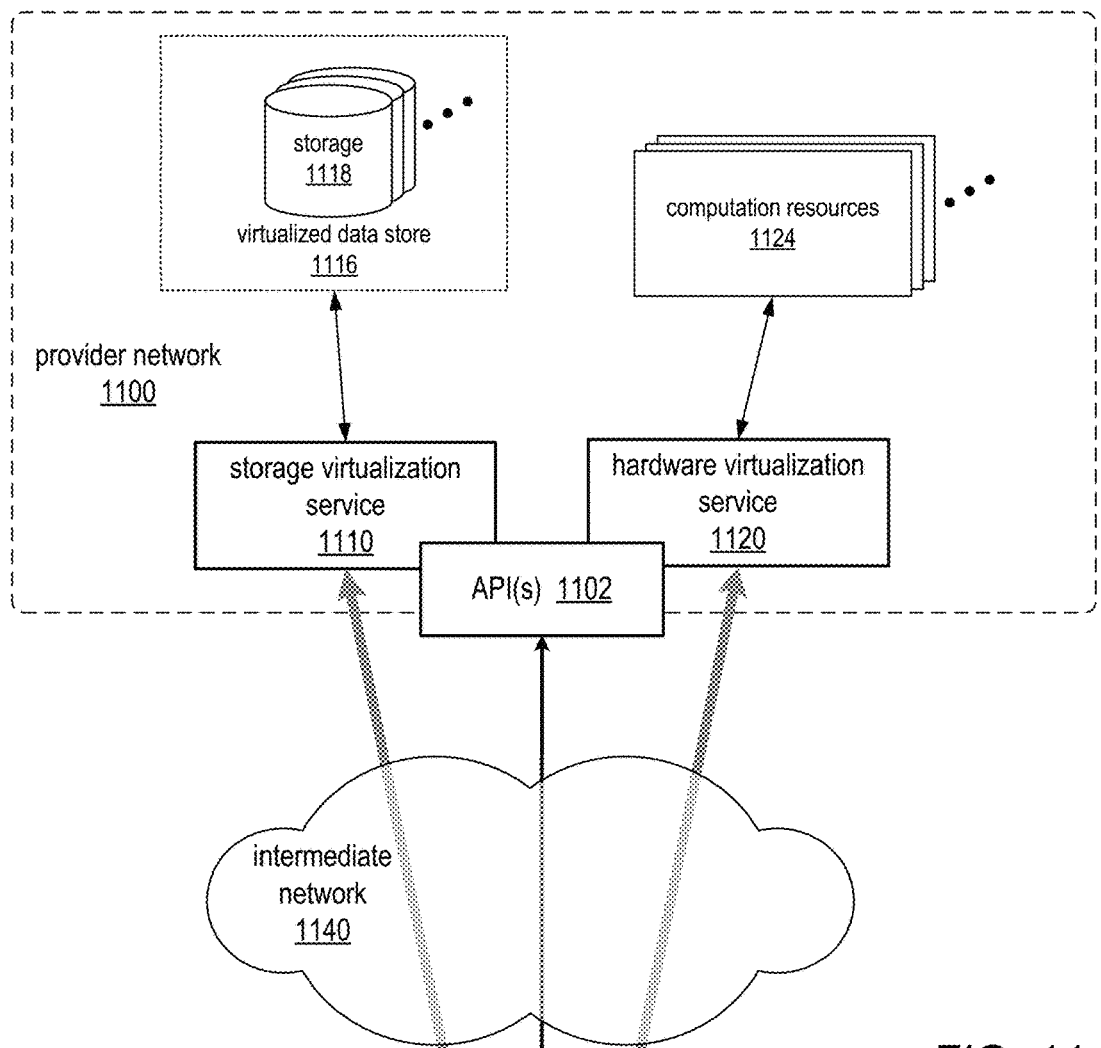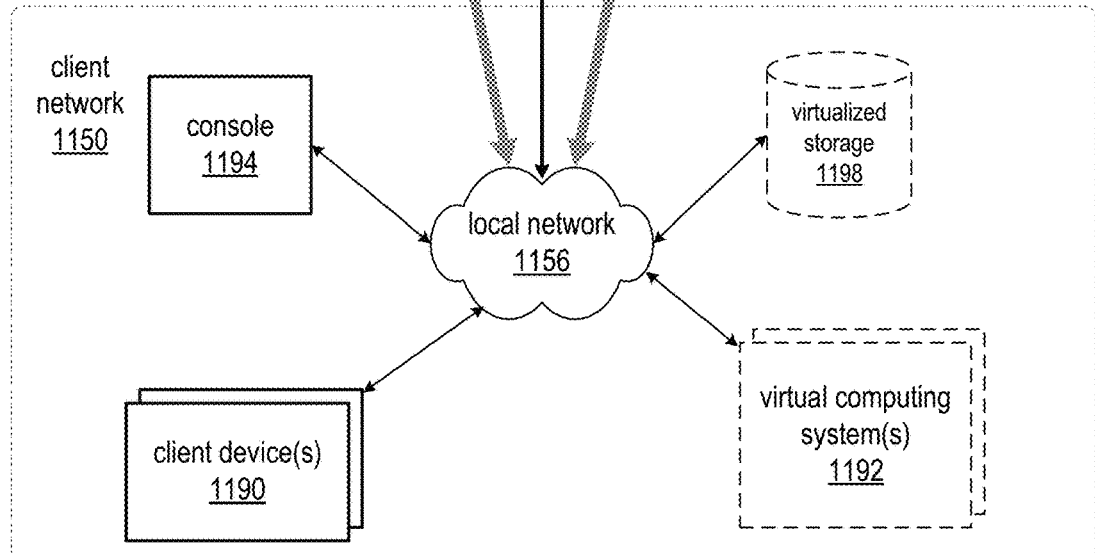
FIG. 11

PRIVATE NETWORK LAYERING IN PROVIDER NETWORK ENVIRONMENTS

This application is a continuation of U.S. patent application Ser. No. 14/548,196, filed Nov. 19, 2014, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF THE DRAWINGS

FIGS. 7A and 7B illustrate example access control rules for layered private networks, according to at least some embodiments.

FIG. 11 is a block diagram of an example provider network that provides a storage virtualization service and a hardware virtualization service to clients, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 2:
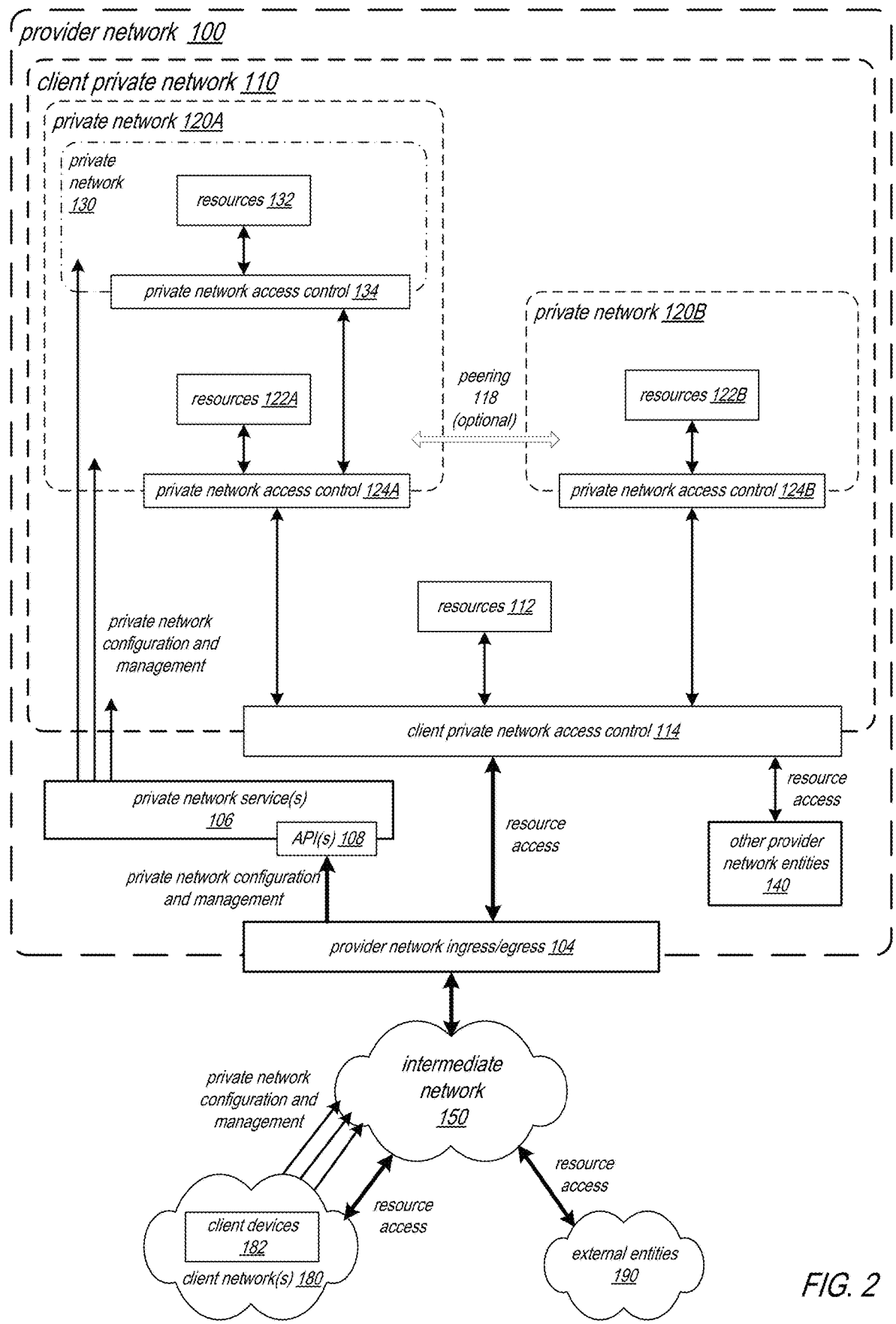
FIG. 2 illustrates an example provider network environment in which embodiments of the methods and apparatus for layering private networks may be implemented.

Various embodiments of methods and apparatus for private network layering in provider network environments are described. Embodiments of private network methods and apparatus are described that allow clients to establish private networks as resources within client private networks on a provider network. Embodiments of the methods and apparatus for private network layering in provider network environments may, for example, be implemented in the context of a service provider that provides to clients or customers, via an intermediate network such as the Internet, virtualized resources (e.g., virtualized computing and storage resources) implemented on a provider network of a service provider. FIG. 2 illustrates an example provider network environment in which embodiments of the methods and apparatus for private network layering may be implemented. FIGS. 9 through 13 and the section titled Example provider network environments further illustrate and describe example service provider network environments in which embodiments of the methods and apparatus as described herein may be implemented.

Figure 1:
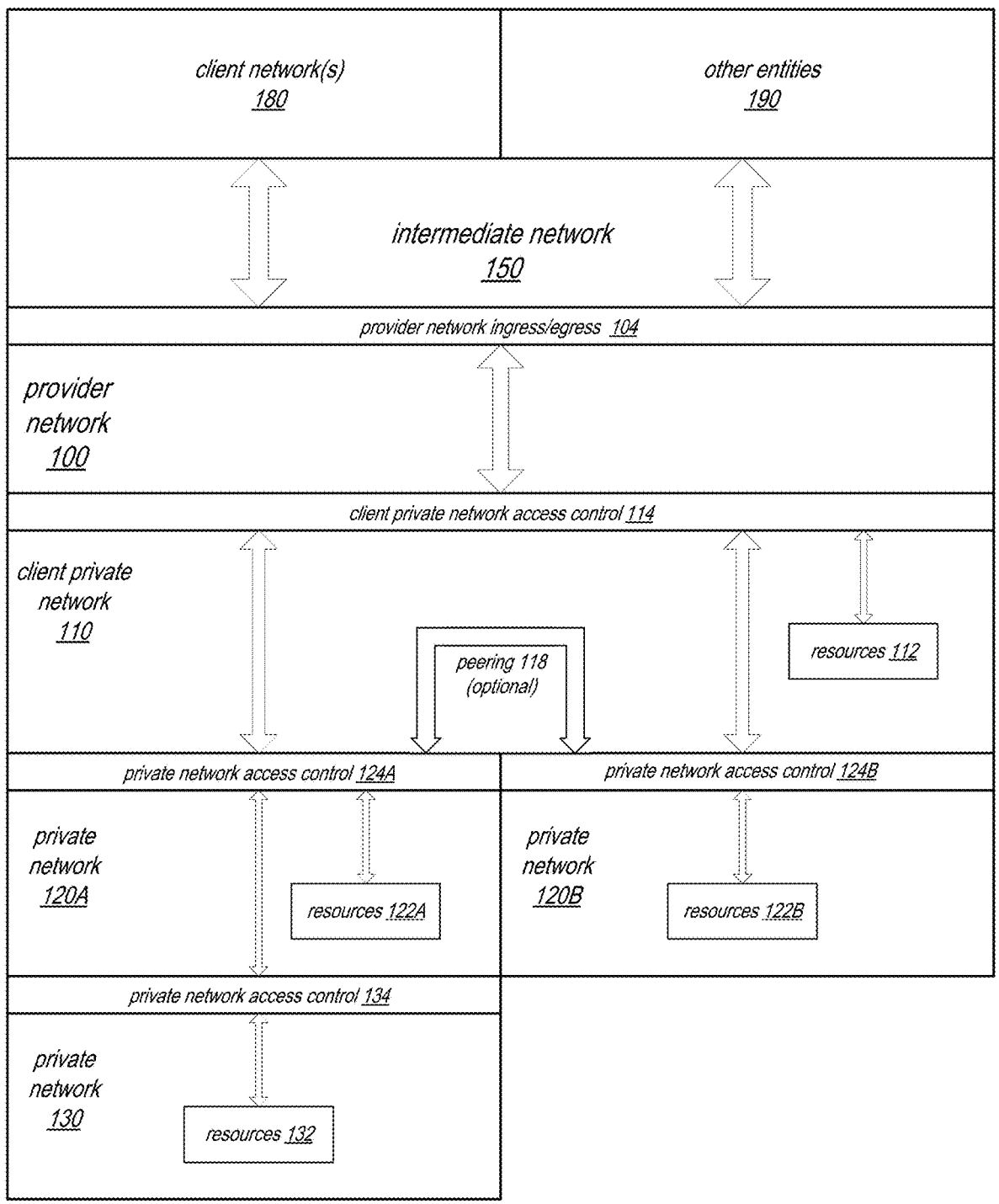
FIG. 1 illustrates layered private networks in a provider network, according to at least some embodiments.

FIG. 1 graphically illustrates layered private networks in a provider network, according to at least some embodiments. FIG. 1 shows as an example a provider network 100 environment in which entities on client network(s) 180 and other external entities 190 may access resources on a provider network 100 over an intermediate network 150 such as the Internet via a provider network ingress/egress 104 layer. In FIG. 1, one or more clients corresponding to client network(s) 180 have established three layers 110, 120, and 130 of private networks on provider network 100. A private network in a provider network 100 environment may be broadly defined as a network space (e.g., logically defined by an address range) that contains a set of provider network 100 resources of a respective client, and that acts as a logically isolated section on the provider network 100 for the client's resources. For example, in FIG. 1, private network 110 contains resources 112. A private network may include or implement access control and security rules and methods to control access to the private network and to the resources on the private network by entities external to the private network. For example, in FIG. 1, private network 110 includes access control 114 component or layer that controls access to resources 112 from client network(s) 180 and from other entities 190.

A private network established as a resource within another private network may be referred to as a sub private network, and the private network within which a sub private network is established may be referred to as a parent private network. For example, in FIG. 1, private networks 120A and 120B are sub private networks of private network 110, and private network 110 is a parent private network to private networks 120A and 120B. In some embodiments, a parent private network may include one, two, or more sub private networks as resources. In some embodiments, a sub private network may itself be a parent private network that includes one or more sub private networks. For example, in FIG. 1, private network 130 is a sub private network to sub private network 120A. The top-level private network of a particular client implementation on a provider network 100 may be referred to herein as a client private network; for example, private network 110 of FIG. 1 is a client private network. While FIG. 1 shows only a single client private network 110 in provider network 100, a provider network 100 may include two or more client private networks 110.

In at least some embodiments, while a sub private network may be a resource within its parent private network, the sub private network may be separately owned from its parent private network. For example, referring to FIG. 1, a first client may establish a client private network 110 on provider network 100, and may allow one or more other clients to establish sub private networks 120A and 120B as resources within the client private network 110. Similarly, in some embodiments, the owners of the private networks 120A and 120B may allow one or more other clients to establish sub private networks as resources. For example, in FIG. 1, the owner of private network 120A may allow another client to establish sub private network 130 as a resource within private network 120A. As a non-limiting example use case, a client entity such as a corporation may establish a top-level client private network, and may allow one or more sub-entities (e.g., divisions, departments, etc.) to establish sub private networks within the corporate-wide client private network.

In some embodiments, an owner of a private network may be able to restrict creation of sub private networks within its sub private networks. For example, in FIG. 1, the owner of client private network 110 may not allow the owner of sub private network 120B to create sub private networks within sub private network 120B. In some embodiments, an owner of a private network may be able to monitor various aspects its sub private networks and take action to control a sub private network if the sub private network is not well-behaved. For example, referring to FIG. 1, an owner of a private network 110 may be able to restrict or deny access to a sub private network 120 or to particular resources on a sub private network 120 via access control rules in client private network access control 114, or may terminate the sub private network 120 if necessary.

In some embodiments, a parent private network may control access to and from its sub private networks as resources on the parent private network. For example, in FIG. 1, client private network 110 implements client private network access control 114 to control access to resources 112; client private network access control 114 may include access control rules to control access to sub private networks 120A and 120B. In some embodiments, each of the parent's one or more sub private networks also controls access to the resources on the sub private network, including any sub private networks created as resources within the sub private network, by entities external to the sub private network. For example, in FIG. 1, private network 120A implements private network access control 124A to control access to resources 122A; private network access control 124A may include access control rules to control access to sub private network 130. Private network 130 in turn implements private network access control 134 to control access to resources 132. This enables a layered approach to access and security in which a parent private network may implement access control and security rules and methods for sub private networks implemented as resources on the parent private network; the owners of the sub private networks may supplement the access control and security according to the specific needs of the sub private networks. Thus, to access resources on a sub private network, an external entity has to pass access control for the sub private network's parent private network including access control rules for its sub private networks, and then pass the sub private network's own access control for its resources.

In addition to enabling a layered approach to access and security, embodiments may enable a layered approach to resource sharing in which a private network may allow or restrict access to its resources by its parent private network, by its sibling private networks, and/or by its sub private network(s). In some embodiments, resources may be sharable between a parent private network and its sub private networks.

In some embodiments, default access control rules may be applied to new sub private networks created within a parent private network. In some embodiments, according to the default access control rules, a sub private network can see and access at least some of the resources of its parent private network, but by default the parent private network is not able to see and access the resources of its sub private networks. For example, in FIG. 1, resources 112 on client private network 110 may be accessible from resources 122A on sub private network 120A according to default client private network access control 114 rules, but resources 122A on sub private network 120A may be inaccessible from resources 112 on client private network 110 according to default private network access control 124A rules.

In some embodiments, instead of the default access control rules allowing a sub private network to see and access the resources of its parent private network while restricting access to the sub private network's resources by the parent private network, the default access control rules may instead allow the parent private network to see and access the resources of the sub private network, while restricting access from the sub private network to the resources on the parent provider network. In some embodiments, the default access control rules may allow the parent private network to see and access the resources of its sub private network and allow the sub private network to see and access the resources of the parent private network. In some embodiments, the default access control rules may restrict access to the parent private network's resources from the sub private network and restrict access to the sub private network's resources from the parent private network.

In some embodiments, a client may be able to specify or configure the default access control rules to be applied for new sub private networks. For example, in some embodiments, an application programming interface (API) to a private network service may allow a client to select, specify, and/or modify default access control rules to be applied to new sub private networks created within a parent private network. For example, in some embodiments, a client may be allowed to select from among two or more high-level default access control rules. As a non-limiting example, in some embodiments, a client may be allowed to select one of the following high-level default access control rules for new sub private networks:

Both the parent and the sub private network have full access to each other's resources.
Both the parent and the sub private network are restricted from accessing the other's resources.
The parent can access the sub private network's resources, but the sub private network cannot access the parent's resources.
The sub private network can access its parent's resources but the parent cannot access the sub private network's resources.

In some embodiments, the client may be allowed to configure more specific access control rules to be used as default access control rules for sub private networks. For example, the client may be allowed to specify particular resources within a parent that can or cannot be accessed from a sub private network, and/or to specify particular resources within a sub private network that can or cannot be accessed from its parent. In some embodiments, the owner of a parent private network may be allowed to modify the access control rules on the parent for a sub private network to change the default access control rules for accessing the parent's resources from the sub private network. For example, if by default the sub private network is allowed to access the parent's resources, the owner of the parent may change the rules so that the sub private network cannot access at least some of the parent's resources. In some embodiments, the owner of a sub private network may be allowed to modify the access control rules on the sub private network to change the default access control rules for accessing the sub private network's resources from the parent. For example, if by default the parent private network is not allowed to access the sub private network's resources, the owner of the sub private network may change the rules so that the parent can access at least some of the sub private network's resources.

In some embodiments, since sub private networks are resources of a parent private network, a sub private network may be aware of or may discover its sibling sub private network(s) if the resources on the parent private network are visible from its sub private networks according to the access control rules. For example, in FIG. 1, sub private network 120A may be aware of sub private network 120B on client private network 110 if the resources on client private network 110 are visible from its sub private networks, as both sub private network 120 and sub private network 120B are resources on client private network 110. In some embodiments, however, the access control rules may not allow a sub private network to see or access the resources of its sibling sub private network(s). For example, in FIG. 1, while sub private network 120B may be visible from sub private network 120A, resources 122B on sub private network 120B may be inaccessible from resources 122A on sub private network 120A according to private network access control 124B rules.

In some embodiments, a parent private network may be allowed to restrict visibility of and access to its other resources by its sub private networks. For example, in FIG. 1, the owner of client private network 110 may modify rules in client private network access control 114 to restrict visibility of and/or access to resources 112 from resources 122A on sub private network 120A. In some embodiments, a sub private network may be allowed to make its resources visible and accessible to its parent private network, and/or to its sibling sub private network(s). For example, in FIG. 1, the owner of sub private network 120A may modify rules in private network access control 124A to allow access to its resources 122A from client private network 110 and/or from sub private network 120B. In some embodiments, a resource made accessible to a parent private network by a sub private network is by default accessible to other sub private networks of the parent private network. However, in some embodiments, the parent private network or any sub private network may restrict access by other sub private networks as necessary or desired.

At least some embodiments may allow peering 118 of sub private networks within a private network. For example, as shown in FIG. 1, private network 120A is peered with private network 120B via the client private network 110 structure. Allowing peering of the sub private networks via their parent private network may, for example, allow the sub private networks to communicate through the infrastructure of the parent private network and with the security control of the parent private network without having to establish a peering through the provider network infrastructure and without having their communications having to traverse the provider network. In some embodiments, sub private networks created within a private network may be automatically peered via the parent private network; thus, in these embodiments, the owners of the sub private networks do not have to manually establish peerings with other sub private networks. However, an owner of a sub private network may be allowed to control, restrict or terminate the peering with other sub private networks in some embodiments.

Figure 12:
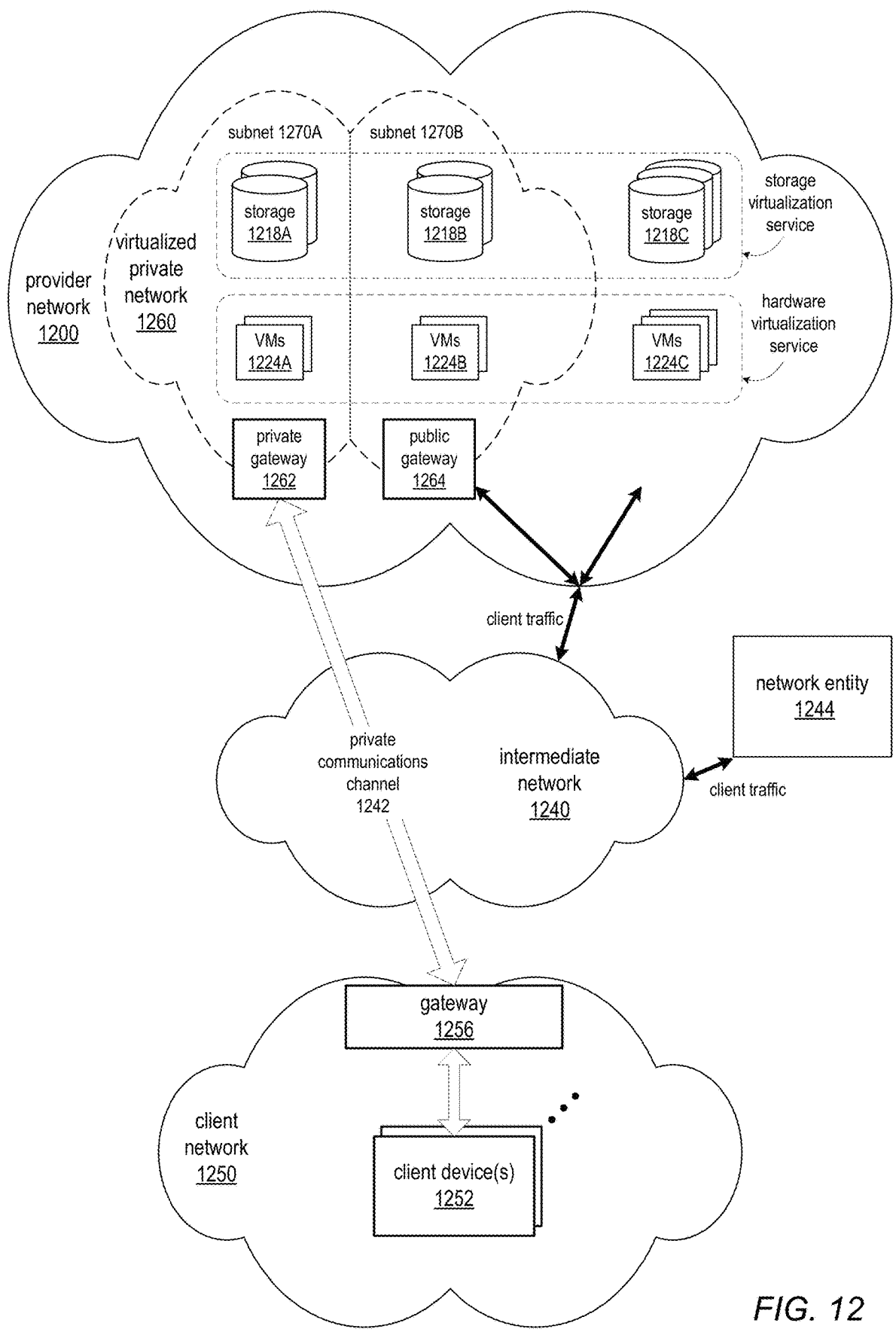
FIG. 12 illustrates an example provider network that provides virtualized private networks to at least some clients, according to at least some embodiments.
Figure 13:
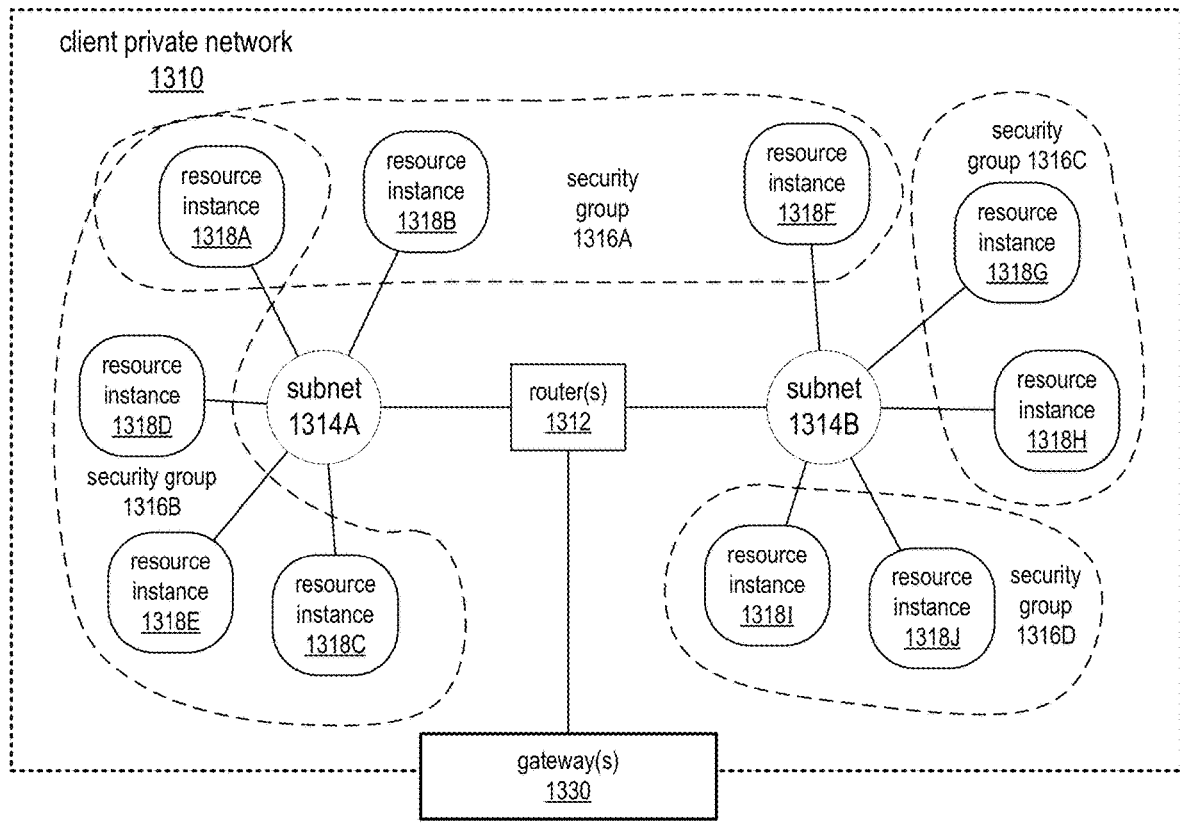
FIG. 13 illustrates subnets and security groups in an example virtual private network implementation on a provider network, according to at least some embodiments.

In some embodiments, a parent private network may leverage one or more security- and/or access-related items in managing and controlling resource sharing by its sub private networks. For example, in some embodiments, a parent private network may be subdivided into two or more subnets as illustrated in FIGS. 12 and 13, and may leverage network access control lists (ACLs) to control access to its subnets by its sub private networks. For example, in FIG. 1, client private network 110 may include two subnets as illustrated in FIG. 12 or 13, and may use a network ACL to allow or deny its sub private networks access to the subnets. As another example, in some embodiments, a parent private network may implement security groups as illustrated in FIG. 13, and the owner of the parent private network may establish and/or modify rules for each security group to control access to the resource instances associated with each security group by its sub private networks.

In some embodiments, one or more security- and access-related items, which may include but are not limited to security groups, security rules, routing tables, and network ACLs used to control access into subnets, may exist in the parent private network as sharable items for the parent private network's sub private networks. In some embodiments, the parent private network may maintain the security-related items for use by the sub private networks, but may not implement the security-related items itself. In this way, the parent private network could remain open for those sub private networks that need general access, while those sub private networks that need tighter controls, for example based on company policies, could use the shared security-related items.

Embodiments of the private network layering methods and apparatus as described herein may, for example, allow a client entity (e.g., a corporation, company, university, etc.) that needs access to different resources to be controlled by different sub-entities (e.g., divisions, managers, departments, etc.) to give those sub-entities the separation and access control for their computation and data storage resources that they need, while at the same time allowing global access control methods and rules to be created and enforced for the resources of all sub-entities.

In at least some embodiments, the service provider that provides the provider network 100 on which a layered private network is implemented may charge clients for resource usage (e.g., computation and storage resource usage), bandwidth usage, and other types of network usage. In some embodiments, the responsible party for a layered private network implementation may be the owner of the top-level private network of the client implementation on the provider network. For example, in FIG. 1, the responsible party for the layered private network implementation may be the owner of client private network 110. In some embodiments, the service provider may bill the responsible party, (e.g., the owner of client private network 110) for all usage by the layered private network. In some embodiments, the billing may include breakdowns of cost/usage by the various private networks in the layered private network implementation. For example, in FIG. 1, billing reports provided to the owner of client private network 110 may break down the billing to show cost/usage figures at the client private network 110 level and for each sub private network 120A, 120B, and 130 of the client private network 110. In some embodiments, for security and/or privacy reasons, the billing reports provided to the owner of client private network 110 may show collective cost/usage figures for sub private networks, not showing detailed usage per resource for example. The owner of the client private network 110 may then collect payment from its sub private networks as appropriate. Alternatively, in some embodiments, the owner of a client private network may arrange with the service provider to bill one or more its sub private networks separately.

FIG. 2 illustrates an example provider network environment in which embodiments of the methods and apparatus for private network layering may be implemented. Referring to FIG. 2, in at least some embodiments of a provider network 100, at least some of the resources provided to clients of a service provider via the provider network 100 may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider (represented in FIG. 2 by client network(s) 180), via external client device(s) coupled to the provider network 100 via an intermediate network 150 such as the Internet, may access one or more services of the provider network via APIs to the services to obtain and configure resource instances, including but not limited to computation resources and storage resources.

At least some of the resource instances on the provider network 100 may be implemented according to hardware virtualization technology that enables multiple operating systems to run concurrently on a host computer, i.e. as virtual machines (VMs) on the host. A hypervisor, or virtual machine monitor (VMM), on a host presents the VMs on the host with a virtual platform and monitors the execution of the VMs. Each VM may be provided with one or more private IP addresses; the VMM on a respective host may be aware of the private IP addresses of the VMs on the host. For further information about hardware virtualization technology on a provider network, see FIG. 10.

Referring to FIG. 2, the provider network 100 may include a network substrate that includes networking devices such as routers, switches, network address translators (NATs), and so on, as well as the physical connections among the devices. In at least some embodiments, the VMMs or other devices or processes on the network substrate may use encapsulation protocol technology to encapsulate and route network packets (e.g., client IP packets) over the network substrate between resource instances on different hosts within the provider network 100. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. In at least some embodiments, the encapsulation protocol technology may include a mapping service that maintains a mapping directory that maps IP overlay addresses (public IP addresses) to substrate IP addresses (private IP addresses) and that may be accessed by various processes on the provider network 100 for routing packets between endpoints on the network substrate. For further information about a virtual network technology that uses an encapsulation protocol to implement an overlay network on a network substrate, see FIGS. 9 through 13.

Referring to FIG. 2, a service provider may provide one or more private network services 106 and one or more application programming interfaces (API(s)) 108 to the services 106 that allow clients to provision logically isolated sections of the provider network 100 in which the clients can launch their respective resource instances in a client-defined virtual network on the provider network 100, referred to herein as a virtualized private network or client private network, or as simply a private network. Via the APIs 108, a client (represented in FIG. 2 by client network(s) 180) may establish, configure, and manage a client private network 110 on provider network. The client may also establish and manage client private network access control 114 for the virtual networking environment of the client private network 110 via the API(s) to private network service(s) 106. For example, the client may perform one or more of selecting private IP address ranges, creating subnets and network ACLs, creating and managing security groups, and configuring route tables, network gateways, load balancers, routers, and other network functionalities to configure the client private network 110 and to control access to the client private network 110 and its resources 112. Via the API(s) 108, a client may customize the network configuration of their client private network 110. For example, as illustrated in FIG. 12, a client can create a public-facing subnet for web server resources that has access to the Internet, and may place backend system resources such as databases or application servers in a private-facing subnet with no Internet access. A client may leverage multiple layers of security, including but not limited to security groups and network ACLs, to control access to subnets and/or to resource instances in each subnet, for example as illustrated in FIG. 13.

In some embodiments, a given client may establish one, two, or more separate private networks 110 on a provider network 100, and different clients may each establish private networks 110 on a provider network 100. In some embodiments, a client may specify a private IP address space for each client private network 110 on the provider network 100. In some embodiments, the private IP address spaces of two (or more) client private networks 110 may, but do not necessarily, overlap.

In embodiments, the private network services 106 and API(s) 108 may allow clients to establish and provision sub private networks as resources within their private networks, and/or may allow a client to grant permission to other entities (e.g., other clients, or sub-entities of the client such as divisions, departments, etc.) to establish and provision sub private networks as resources within the client's private network(s). For example, referring to FIG. 2, a first client may establish a client private network 110 on provider network 100, and may allow one or more other clients to establish sub private networks 120A and 120B as resources within the client private network 110. Similarly, in some embodiments, the owners of the private networks 120A and/or 120B may allow one or more other clients to establish sub private networks as resources within their private networks 120. For example, in FIG. 2, the owner of private network 120A may allow another client to establish sub private network 130 as a resource within private network 120A. As a non-limiting example use case, a client entity such as a corporation may establish a top-level client private network 110, and may allow one or more sub-entities (e.g., divisions, departments, etc.) to establish sub private networks 120A and 120B within the corporate-wide client private network 110.

In some embodiments, via the service(s) 106 and API(s) 108, a client (e.g., a sub-entity of a client that owns a client private network) may establish, configure, and manage a sub private network (e.g., sub private network 120A) within a parent private network (e.g., client private network 110) with appropriate permission from the owner of the parent private network. The client may also establish and manage private network access control (e.g., private network access control 124A) for the sub-private network via the API(s). For example, the client may perform one or more of selecting private IP address ranges, creating subnets and network ACLs, creating and managing security groups, and configuring route tables, network gateways, load balancers, routers, and other network functionalities to configure the private network 120A and to control access to the client private network 120A and its resources 122A.

In some embodiments, a client may establish and maintain private network access control rules and methods to control access to the resources within a private network via the private network services 106 and API(s) 108. In some embodiments, the private network access control rules may include sub private network access control rules for the private network to control access to and from its sub private networks. For example, in FIG. 2, the owner of client private network 110 may establish, maintain, and modify sub private network access control rules within client private network access control 114 via the private network services 106 and API(s) 108 to control access to and from sub private networks 120A and 120B. Similarly, the owner of a sub private network 120 of client private network 110 may establish, maintain, and modify private network access control 124 rules for the respective sub private network 120 via the private network services 106 and API(s) 108 to control access to and from resources 122 on the sub private network 120. In some embodiments, the sub private network access control rules within a parent private network's access control may be configured to perform one or more of, but not limited to, the following:

Determining which entities (e.g., resources of the parent including other sub private networks, resources of other sub private networks of the parent, and resources external to the parent private network) can access each sub private network through the parent, and with what permissions the entities can access resources on the sub private networks.

Determining what resources (e.g., resources of the parent including other sub private networks, resources of other sub private networks of the parent, and resources external to the parent private network) each sub private network or specific resources within each sub private network can access through the parent.

Controlling access to and from specific resources and/or services within the parent private network's sub private networks, including resources in any descendant sub private networks that are visible from the parent private network.

In some embodiments, a client may be able to restrict creation of sub private networks within its sub private networks. For example, in FIG. 2, the owner of client private network 110 may not allow the owner of sub private network 120B to create sub private networks within private network 120B. In some embodiments, an owner of a private network may be able to monitor various aspects of its sub private networks and take action to control, restrict, or shut down a sub private network if the sub private network is not well-behaved. For example, referring to FIG. 2, an owner of a private network 110 may be able to restrict or deny access to sub private network 120B or to particular resources on sub private network 120B via private network access control 114 rules based on monitored traffic to and/or from the sub private network 120B. Alternatively, in some embodiments, an owner of a parent private network may terminate a misbehaving sub private network if necessary.

In at least some embodiments, a parent private network may control access to and from its sub private networks as resources on the parent private network. For example, in FIG. 2, client private network 110 implements client private network access control 114 to control access to resources 112; client private network access control 114 may include access control rules to control access to sub private networks 120A and 120B. In some embodiments, the sub private network access control rules within a parent private network's access control may be configured to control access to particular resources within its sub private networks, and to control access to particular resources from its sub private networks. As an example, referring to FIG. 2, client private network 110 may allow overall access to sub private network 120B, but restrict access to a particular resource 122B on sub private network 120B. As another example, client private network 110 may block access to a particular resource 112 from sub private network 130, but allow access from sub private network 120A, which is the parent of sub private network 130. As another example, client private network 110 may block access to a particular resource 122B in sub private network 120B from sub private network 120A and/or from sub private network 130.

In some embodiments, each of the parent's one or more sub private networks also controls access to the resources on the sub private network, including any sub private networks created as resources within the sub private network, by entities external to the sub private network via private network access control rules. For example, in FIG. 2, private network 120A implements private network access control 124A to control access to resources 122A; private network access control 124A may include access control rules to control access to and from sub private network 130. Private network 130 in turn implements private network access control 134 to control access to resources 132.

By allowing sub private networks to be established and provisioned within parent private networks, embodiments provide a layered approach to access and security for a client's private network implementation on a provider network in which a parent private network may implement access control and security rules and methods for sub private networks implemented as resources on the parent private network; the owners of the sub private networks may supplement the access control and security according to the specific needs of the sub private networks. In the layered approach to access and security, to access resources on a sub private network, an external entity has to pass access control for its parent private network including its parent private network's sub private network access control rules, and then pass the sub private network's access control. For example, referring to FIG. 2, to access resources 122A on private network 120A, an entity external to the layered private network implementation (e.g., a client device 182 on client network(s), an external entity 190, or another provider network entity 140) has to pass both client private network access control 114, including sub private network access control rules of client private network 110, and private network access control 124A. To access resources 132, the entity would also have to pass sub private network access control rules of private network access control 124A and private network access control 134.

In addition to enabling a layered approach to access and security, embodiments may enable a layered approach to resource sharing in which a private network may allow or restrict access to its resources by its parent private network and/or by its sub private network(s). In some embodiments, resources may be sharable between a parent private network and its sub private networks. In some embodiments, as a default rule, a sub private network can see and access at least some of the resources of its parent private network, but by default the parent private network is not able to see and access the resources of its sub private networks. For example, in FIG. 2, resources 112 on client private network 110 may be accessible from resources 122A on sub private network 120A according to private network access control 114 rules, but resources 122A on sub private network 120A may be inaccessible from resources 112 on client private network 110 according to private network access control 124A rules.

In some embodiments, a parent private network may leverage one or more security- and/or access-related items in managing and controlling resource sharing by its sub private networks. For example, in some embodiments, a parent private network may be subdivided into two or more subnets as illustrated in FIGS. 12 and 13, and may leverage network ACLs to control access to its subnets by its sub private networks. For example, in FIG. 2, client private network 110 may include two subnets as illustrated in FIG. 12 or 13, and may use a network ACL to allow or deny its sub private networks access to the subnets. As another example, in some embodiments, a parent private network may implement security groups as illustrated in FIG. 13, and the owner of the parent private network may establish and/or modify rules for each security group to control access to the resource instances associated with each security group by its sub private networks.

Figure 10:
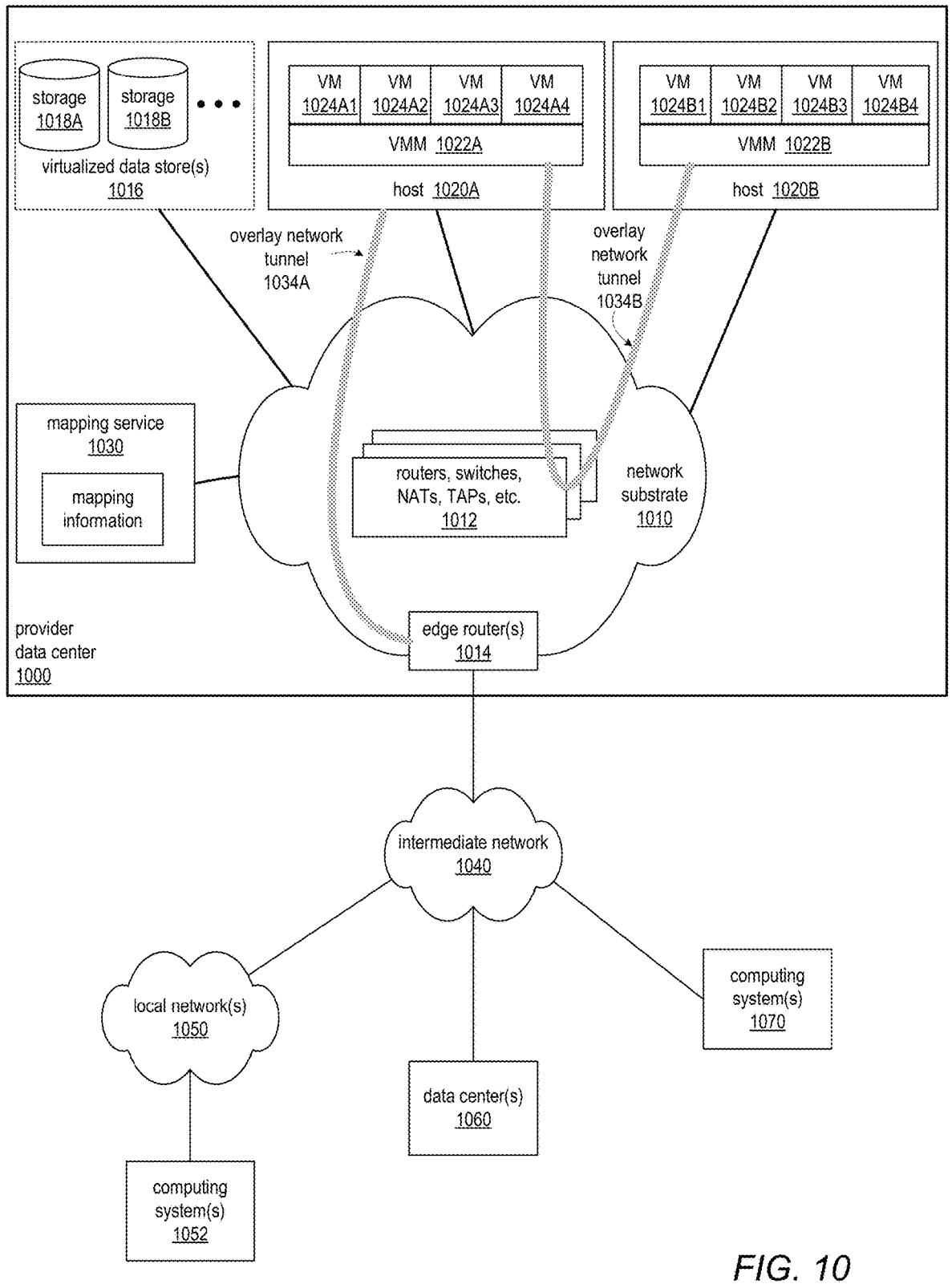
FIG. 10 illustrates an example data center that implements an overlay network on a network substrate using IP tunneling technology, according to some embodiments.

In some embodiments, clients may obtain, assign, and use public IP addresses in a client private network 110, for example as described in reference to FIG. 10. In some embodiments, public IP addresses may also be used within a sub private network with permission from any higher private networks in the layered private network implementation. For example, referring to FIG. 2, public IP addresses may be used within sub private network 130 with permission from its parent private network 120A and from client private network 110. In addition incoming public IP traffic for a sub private network would be directed to its client private network 110, with the packets being processed according to the methods of FIG. 5 or FIG. 6. From the perspective of the sub private network, its parent private network would appear as the intermediate network 150 (e.g., the Internet) looks to the client private network 110. In some embodiments, a sub private network may request a public IP address that would exist in its parent private network's address space, or in any of its ancestor parent private network's address spaces; the public IP address would be accessible to other resources within the sub private network's scope including its own sub private networks and sibling sub private networks. However, the public IP address would not be visible to the intermediate network 150 (e.g., the Internet) or to any private networks that are ancestral to the private network in which the public IP address is created.

Figure 3A:
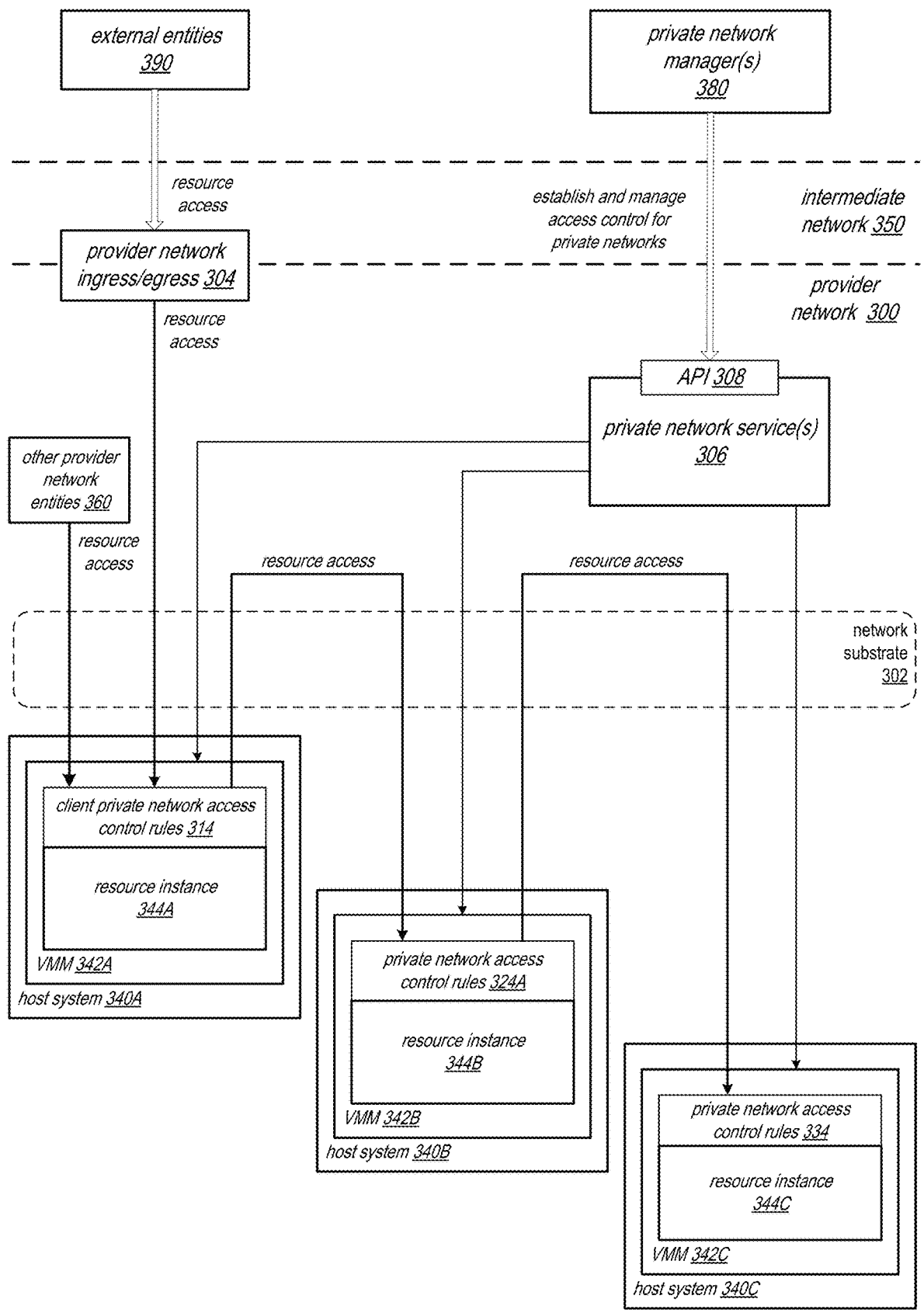
FIG. 3A illustrates an example method for applying access control to resource instances in layered private networks, according to some embodiments.
Figure 3B:
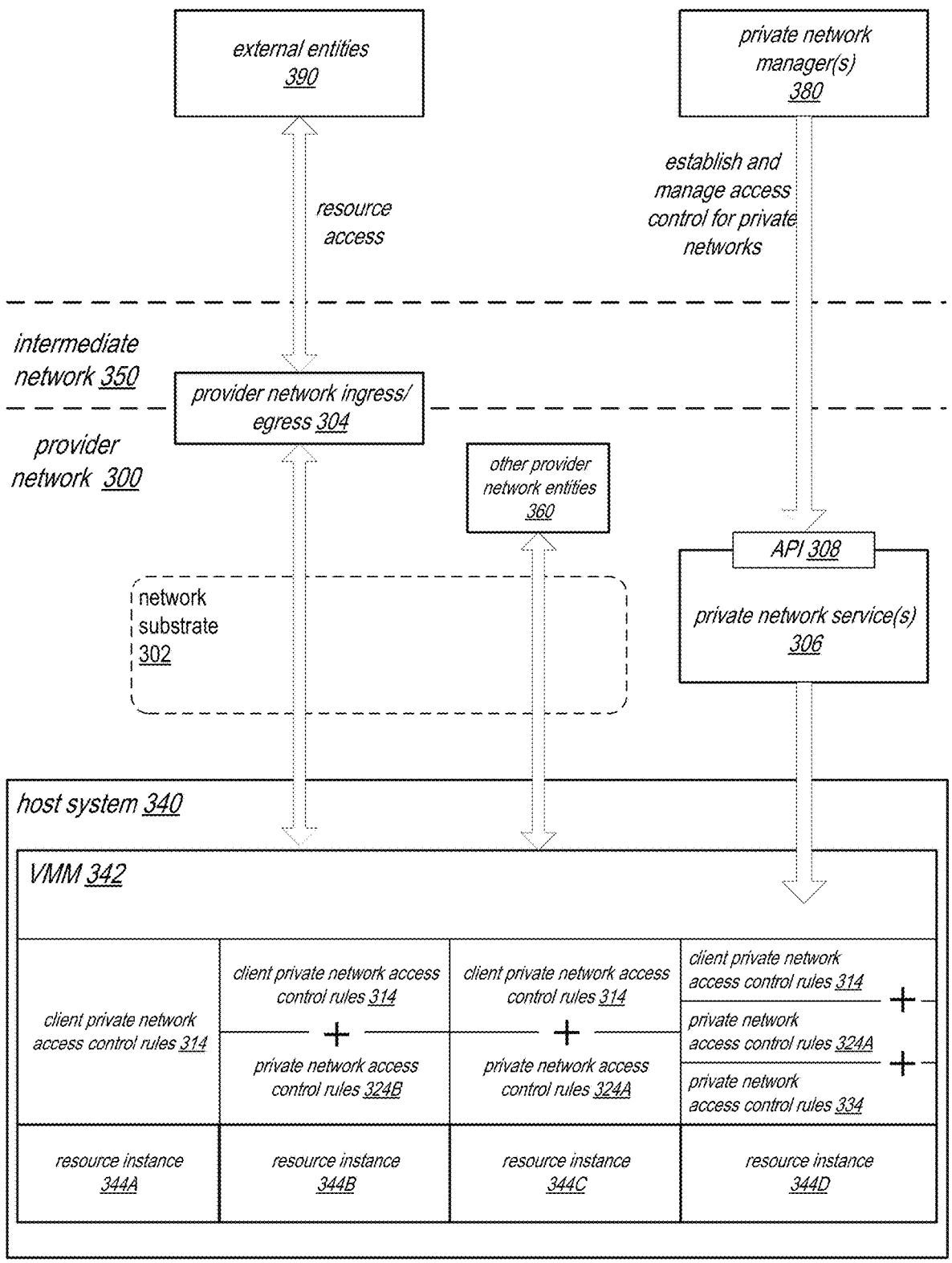
FIG. 3B illustrates another example method for applying access control to resource instances in layered private networks, according to some embodiments.

FIGS. 3A and 3B illustrate example methods for applying access control to resource instances in layered private networks, according to some embodiments. At least some of the resource instances 344 on a provider network 300 may be implemented according to hardware virtualization technology that enables multiple operating systems to run concurrently on a host computer 340, i.e. as virtual machines (VMs) on the host 340. A hypervisor, or virtual machine monitor (VMM) 342, on a host 340 presents the VMs on the host 340 with a virtual platform and monitors the execution of the VMs. Each VM may be provided with one or more private IP addresses; the VMM 342 on a respective host 340 may be aware of the private IP addresses of the VMs on the host 340. For further information about hardware virtualization technology on a provider network, see FIG. 10.

The provider network 300 may include a network substrate 302 that includes networking devices such as routers, switches, network address translators (NATs), gateways, load balancers, and so on, as well as the physical connections among the devices. In at least some embodiments, the VMMs 342 or other devices or processes on the network substrate may use encapsulation protocol technology to encapsulate and route network packets (e.g., client IP packets) over the network substrate 302 between resource instances 344 on different hosts 340 within the provider network 300, between other entities 360 on provider network 300 and resource instances 344, and between external entities 390 and resource instances 344 via provider network ingress/egress 304 (e.g., routers, gateways, etc.). For further information about a virtual network technology that uses an encapsulation protocol to implement an overlay network on a network substrate, see FIGS. 9 through 13.

A service provider may provide one or more private network services 306 and one or more application programming interfaces (API(s)) 308 to the services 306 that allow clients (e.g., private network manager(s) 380) to provision and configure private networks and layered private network topologies on the provider network 300. The private network manager(s) 380 may establish and manage private network access control, including any sub private network access control rules, for each private network, for example as illustrated in FIGS. 1 and 2. In some embodiments, a sub private network may owned and controlled by a different entity than the entity that controls and owns its parent private network; thus, different private network managers may establish and manage different ones of the private networks within a layered private network implementation on the provider network 300.

FIG. 3A illustrates an example method for applying access control to resource instances in layered private networks, according to some embodiments. In FIG. 3A, resource instance 344A is implemented on a host system 340A with virtual machine monitor (VMM) 342A, resource instance 344B is implemented on a host system 340B with VMM 342B, and resource instance 344C is implemented on a host system 340C with VMM 342C. Note, however, that two or more of the resource instances 344 may instead reside on the same host system 340/VMM 342. In this example, referring to the layered private network topology illustrated in FIGS. 1 and 2, resource instance 344A corresponds to a resource 112 on client private network 110, resource instance 344B corresponds to a resource 122A on private network 120A, and resource instance 344C corresponds to a resource 132 on private network 130. Access to resource instance 344A of client private network 110 is controlled by client private network access control rules 314 on host system 340A. An access to resource instance 344B of sub private network 120A must pass client private network access control rules 314 on host system 340A including any sub private network access control rules for client private network 110, and private network access control rules 324A on host system 340B. An access to resource instance 344C of private network 130 must pass client private network access control rules 314 on host system 340A including any sub private network access control rules for private network 110, private network access control rules 324A on host system 340B including any sub private network access control rules for private network 120A, and private network access control rules 334 on host system 340C.

FIG. 3B illustrates an example method for applying access control to resource instances in layered private networks, according to some embodiments. As shown in FIG. 3B, in some embodiments, instead of or in addition to enforcing access control and security at different levels of the network substrate 302 and/or at different network resources of the private networks, security and access control rules at the different layers of a layered private network topology may be combined and pushed down to the VMMs 342 on host systems 340. In some embodiments, private network service(s) 306 (or some other process) may analyze all the rules specified in the access control layers by the private network manager(s) 380 for a given layered private network topology (e.g., network ACLs, security group definitions, etc.) to determine combined rules at the VM/resource instance 344 level. These combined rules may be passed down to the relevant VMMs 342, which may enforce the rules for the respective resource instances 344.

FIG. 3B shows another example of a method for applying access control rules for resource instances in the private network topology illustrated in FIGS. 1 and 2, according to some embodiments. In FIG. 3B, resource instances 344A-344D are shown implemented as VMs on a single host system 340. Note, however, that one or more of the resource instances 344 may instead reside on different host systems 340. In this example, referring to the layered private network topology illustrated in FIGS. 1 and 2, resource instance 344A corresponds to a resource 112 on client private network 110, resource instance 344B corresponds to a resource 122B on private network 120B, resource instance 344C corresponds to a resource 122A on private network 120A, and resource instance 344D corresponds to a resource 132 on private network 130. Access to resource instance 344A is controlled by client private network access control rules 314 derived from client private network access control 114 and enforced by VMM 342. Access to resource instance 344B is controlled by a combination of client private network access control rules 314 derived from client private network access control 114 and private network access control rules 324B derived from private network access control 124B. Access to resource instance 344C is controlled by a combination of client private network access control rules 314 derived from client private network access control 114 and private network access control rules 324A derived from private network access control 124A. Access to resource instance 344D is controlled by a combination of client private network access control rules 314 derived from client private network access control 114, private network access control rules 324A derived from private network access control 124A, and private network access control rules 334 derived from private network access control 134.

Figure 4:
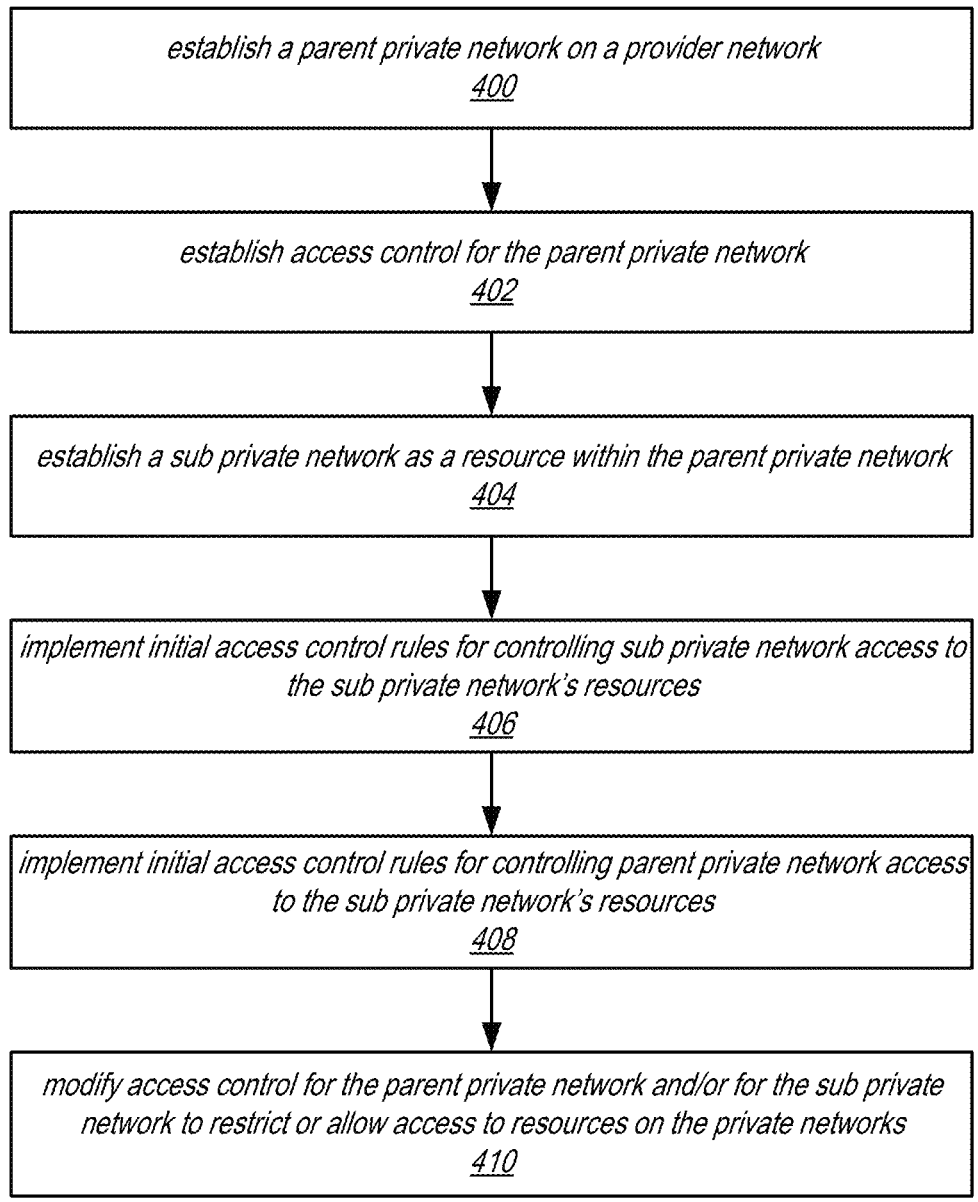
FIG. 4 is a flowchart of a method for establishing sub private networks for client private networks, according to at least some embodiments.

FIG. 4 is a high-level flowchart of a method for establishing sub private networks for client private networks, according to at least some embodiments. FIG. 4 also illustrates application of a layered approach to access control and resource sharing for a client's resources on a provider network as implemented by embodiments of the layered private network methods and apparatus as described herein. The method of FIG. 4 may, for example, be applied in provider network environments as illustrated in FIGS. 1 through 3B.

As indicated at 400 of FIG. 4, a client may establish and provision a parent private network (e.g., a client private network as illustrated in FIGS. 1 and 2) on a provider network, for example via an API to one or more private network services of the provider network as illustrated in FIG. 2. A private network may be broadly defined as a network space that contains a set of provider network resources of a respective client, and that acts as a logically isolated section on the provider network for the client's resources. As indicated at 402 of FIG. 4, the client may establish access control rules for the parent private network to control access to the client's resources in the private network, for example via an API to one or more private network services of the provider network as illustrated in FIG. 2. In some embodiments, the access control rules may include rules to control access to the parent private network's resources from sub private networks created on the parent private network. In some embodiments, the access control rules on the parent private network may be initialized to either allow access to all of its resources from its sub private networks, or to deny access to all of its resources from its sub private networks. In some embodiments, the access control rules of the parent private network are modifiable to deny or allow access to all or to particular resources on the parent private network from its sub private networks, from particular ones of its sub private networks, and/or from particular resources on its sub private networks, for example via an API to one or more private network services of the provider network as illustrated in FIG. 2.

As indicated at 404 of FIG. 4, one or more sub private networks may be established and provisioned as resources within the parent private network. For example, a client may establish and provision one or more sub private networks 120 as resources within a client private network 110 as illustrated in FIGS. 1 and 2. Alternatively, the client may grant permission to allow another entity to establish a sub private network as a resource within a parent private network. For example, referring to FIG. 1, a first client may establish a client private network 110 on provider network 100, and may allow one or more other clients to establish sub private networks 120 as resources within the client private network 110. A sub private network is a private network on the provider network, and may be broadly defined as a network space that contains a set of resources of a respective entity that owns the sub private network, and that acts as a logically isolated section on the provider network for the respective entity's resources. However, the sub private network is a resource of its parent private network, is accessed through the parent private network, and accesses external resources through the parent private network. In some embodiments, while a sub private network may be a resource within its parent private network, the sub private network may be separately owned from its parent private network.

In some embodiments, access control rules may be initialized for the newly established sub private network to control access to the sub private network's resources from its parent and from its sub private network(s) when and if created. As indicated at 406 of FIG. 4, initial access control rules may be implemented for the sub private network to control access to its resources from its sub private network(s). In some embodiments, the initial access control rules may be to either allow access to all of the private network's resources from its sub private networks, or to deny access to all of the private network's resources from its sub private networks. As indicated at 408 of FIG. 4, initial access control rules may be implemented for the sub private network to control access to the sub private network's resources from its parent private network. In some embodiments, the initial access control rules for the sub private network may be to either allow access to all of its resources from its parent private network, or to deny access to all of its resources from its parent private network.

In some embodiments, the initial access control rules for the sub private network may be specified or selected by the owner of the sub private network when creating the sub private network on the parent private network, for example via an API to one or more private network services of the provider network as illustrated in FIG. 2. For example, in some embodiments, the API may present the sub private network creator with the options "Allow parent access by default?" and "Allow children access by default?" Answering "yes" to the first question allows the parent private network access to all of the sub private network's resources by default, while answering "no" denies access to all of the sub private network's resources from its parent by default. Answering "yes" to the second question allows child private networks of the sub private network access to all of the sub private network's resources by default, while answering "no" denies access to all of the sub private network's resources from its child private networks by default. In some embodiments, the initial access control rules of the sub private network are modifiable to deny or allow access to all or to particular resources on the sub private network from its parent or child private networks, from particular ones of its child private networks, and/or from particular resources on its child private networks, for example via an API to one or more private network services of the provider network as illustrated in FIG. 2.

In some embodiments, the initial access control rules may instead be specified at least in part by the owner of the parent private network, for example via an API to one or more private network services of the provider network as illustrated in FIG. 2. In some embodiments, default access control rules for sub private networks may be specified and automatically applied as the initial access control rules for new sub private networks. For example, in some embodiments, the parent private network's access control rules may be automatically applied as the default access control rules for its sub private networks. As another example, default access control rules for new sub private networks may be specified by the owner of the parent private network, for example via an API to one or more private network services of the provider network as illustrated in FIG. 2, and automatically applied to newly created sub private networks on the parent private network.

In some embodiments, the owners or managers of private networks may modify the initial access control rules for the respective private networks, for example via an API to one or more private network services of the provider network as illustrated in FIG. 2. As indicated at 410 of FIG. 4, the access control rules for the parent private network and/or for its sub private network(s) may be modified to restrict or allow access to all or to specific resources on the respective private networks. For example, the owner of a sub private network may modify the sub private network's access control rules to allow one or more resources on the sub private network to be visible and accessible from at least some resources on the parent private network, including its sibling sub private network(s) on the parent private network. As another example, the owner of a sub private network may modify the sub private network's access control rules to not allow access from external entities that are allowed to access other resources on the parent private network according to the parent private network's access control rules. As another example, the owner of a parent private network may modify the parent private network access control rules to restrict or allow access to one or more resources on the parent private network from one or more of its sub private networks. As another example, the owner of a parent private network may modify the parent private network access control rules to restrict or allow access to one or more resources on the parent private network from a sub private network of one of its sub private networks.

While not shown in FIG. 4, in some embodiments, a parent private network may include one, two, or more sub private networks as resources. In addition, in some embodiments, a sub private network may itself be a parent private network that includes one or more sub private networks. In some embodiments, a parent private network may implement different access control rules for its sub private networks to differently control access to the sub private networks and/or access to particular resources on the sub private networks.

The method of FIG. 4 may provide a layered approach to access control and resource sharing for a client's resources on a provider network. A parent private network may implement access control rules for accessing its sub private networks that are implemented as resources on the parent private network; the sub private networks may implement their own access control rules for accessing resources on the sub private networks according to the specific needs of the sub private networks. To access resources on a sub private network, an entity has to pass the access control rules for the sub private network's parent private network, and then pass the sub private network's own access control rules for its resources. To access resources on its parent private network, a resource on a sub private network has to pass the access control for the parent private network. More generally, to access a resource on a sub private network in a layered private network implementation, an external entity has to pass access control of one or more private network layers above the sub private network in the implementation, and then pass the sub private network's own access control rules for its resources. To access a resource on a higher private network from a lower private network in a layered private network implementation, an entity on the lower private network has to pass the access control of one or more private networks above or prior to the sub private network in the implementation including the access control of the private network that includes the target resource. To access a resource on another sub private network that is on a different branch off of a parent private network, an entity on a sub private network has to pass the access control of the parent private network and of one or more private networks on the different branch including the access control of the sub private network that includes the target resource.

In addition to controlling access to resources on its sub private networks, a parent private network's access control rules may control access to other resources on the parent private network (including but not limited to other sub private networks of the parent private network) by the resources on its sub private networks. The sub private networks' and parent private network's access control rules may be initialized or modified to allow access to the parent private network's resources by resources within its sub private networks, thus allowing the sub private networks to share resources of the parent private network. In addition, the sub private networks' and parent private network's access control rules may be initialized or modified to allow access to one sub private network's resources by resources within another sub private network, thus allowing the sub private networks to share resources with their siblings.

Figure 5:
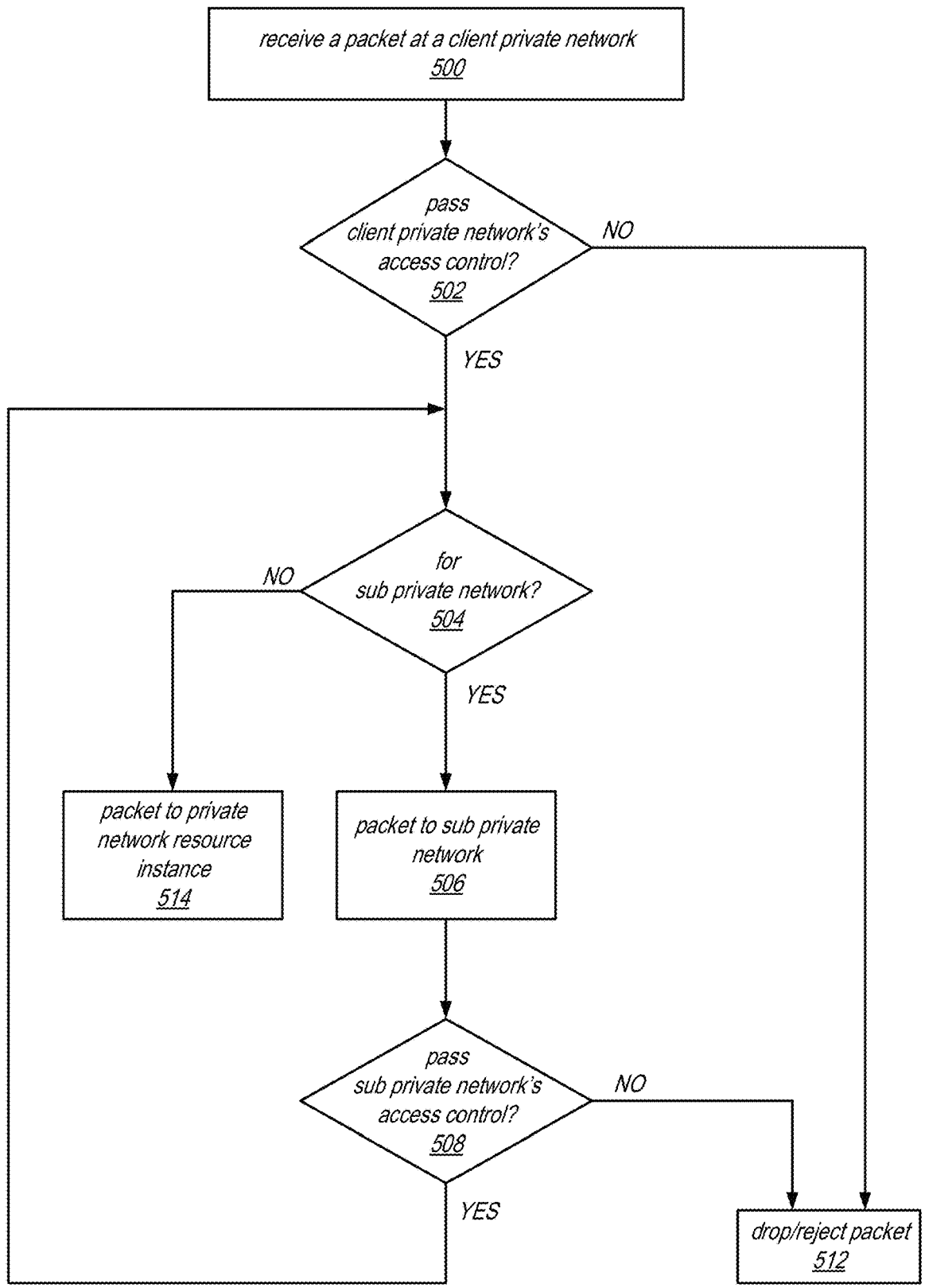
FIG. 5 is a flowchart of a method for receiving and processing packets in layered private networks, according to some embodiments.

FIG. 5 is a flowchart of a method for receiving and processing network packets (e.g., client IP packets) in layered private networks, according to some embodiments. FIG. 5 illustrates application of a layered approach to access and security for a client's resources on a provider network as implemented by embodiments of the layered private network methods and apparatus as described herein. The method of FIG. 5 may, for example, be applied in layered private network implementations in provider network environments as illustrated in FIGS. 1 through 3.

As indicated at 500 of FIG. 5, a packet may be received at a client private network from an external source. One or more processes and/or devices on the client private network may apply access control rules of the client private network to the packet. In some embodiments, the client private network's access control rules may include access control rules that may be applied to packets to control access to sub private networks of the client private network. These sub private network access control rules of the parent private network may include general rules for accessing sub private networks, rules for accessing particular sub private networks, and/or rules for accessing particular resources on particular sub private networks. At 502 of FIG. 5, if the packet does not pass the client private network's access control rules, then the packet may be dropped or rejected as indicated at 512. At 502 of FIG. 5, if the packet does pass the client private network's access control rules, one or more processes and/or devices on the client private network may determine if the packet is targeted at a resource instance on this private network or is targeted at a sub private network of this private network. For example, packets addressed to a certain address range may be targeted at resource instances on this private network, while one or more other address ranges may be mapped to one or more sub private networks of this private network (with this private network being the parent private network). At 504 of FIG. 5, if the packet is targeted at a resource instance on this private network, then the packet is sent to the respective resource instance on this private network as indicated at 514.

At 504 of FIG. 5, if the packet is targeted at a sub private network of this private network, then the packet is sent to the respective sub private network, as indicated at 506 of FIG. 5. One or more processes and/or devices on the sub private network may then apply access control rules of the sub private network to the packet. At 508 of FIG. 5, if the packet does not pass the sub private network's access control rules, then the packet may be dropped or rejected as indicated at 512. At 508 of FIG. 5, if the packet does pass the sub private network's access control rules, the method returns to element 504 to check if the packet is for a resource instance on this private network, in which case the packet is sent to the respective resource instance as indicated at 514 of FIG. 5, or is targeted at a sub private network of this private network, in which case the method continues at 506. Thus, packets may be processed through one, two, or more layers of private networks in a layered private network implementation until reaching a target resource instance on one of the private networks, assuming that the packets pass all of the access control and security rules of the intervening private network(s).

In some embodiments, instead of applying access control rules for all of the layers of private networks in a layered private network implementation to each packet, the access control rules may be applied to one or more packets from a source to a destination on the layered private network to determine if the packet(s) pass or fail the layered private network access control. If the packet(s) pass the layered private network access control for the source and the destination, then a virtual connection (or tunnel) may be established between the source and the destination resource instance so that additional packets from the source to the destination can pass through the layered private network implementation without applying the access control rules to every packet. For example, in some embodiments, to establish a virtual connection, a flag may be set in metadata for the additional packets at the border of the top-level client private network in the layered private network implementation that indicates to any intervening layers of access control that the packets can be passed to the target resource instance without applying security and access control to the packets. In some embodiments, establishing a virtual connection from a source to a target resource may involve establishing an overlay network tunnel according to Internet Protocol (IP) tunneling technology, for example as illustrated in FIG. 10. Note that other methods for establishing connections through the layered private networks between sources and endpoints may be used in various embodiments. If the packet(s) fail the access control, then a block may be established for the source to the destination resource instance so that additional packets from the source to the destination can be summarily rejected without applying the access control rules. For example, in some embodiments, to establish a block for a source-target pair on the layered private network implementation, a flag or rule may be set for the source-target pair at the border of the top-level client private network in the layered private network implementation that indicates that any subsequent packets from the source directed to the target resource instance can be summarily rejected without applying security and access control to the packets.

In some embodiments, the virtual connections and/or blocks between sources and destination resource instances within the layered private network implementation as described above may time out or expire after a specified period or time limit. The time limit used may be implementation-specific, and in some embodiments may be configurable. For example, in some implementations, a short time limit of one second, or a few seconds, may be used. However, longer or shorter time limits may be used in various implementations. In some embodiments, instead of or in addition to expiring the virtual connections and/or blocks after a specified period, virtual connections and/or blocks may be terminated based on certain events. For example, a virtual connection or block between a source and a destination resource instance may be terminated in response to a change in the access control rules of one or more of the virtual private networks between the source and the destination resource instance. A virtual connection and/or block between a source and a destination may be re-established in response to receiving and processing subsequent packets from the source directed to the destination.

Establishing time-limited virtual connections and/or blocks between sources and destinations as described above may, for example, increase efficiency in a layered private network implementation carrying a high volume of traffic destined for resources on subnetworks by not validating all of the packets against the access control rules of every private network between the source and destination in the implementation. Instead, validation may occur for one or more packets from a source to a specific destination, and then packets from the source to the destination may either be sent to the destination via a virtual connection or summarily rejected according to a block on the source-destination pair. Since the status of a particular source and/or destination resource instance may change, the virtual connections and/or blocks are time-limited so that packets from the source to the destination may be periodically re-evaluated according to the access control rules. This may reduce the amount of validation being performed on packets, while still keeping the system responsive to any changes in the validity of the source-destination pairs, allowing a source to communicate with a destination that it was previously blocked from accessing or to block access to a destination that a source was previously allowed to communicate with.

Figure 6:
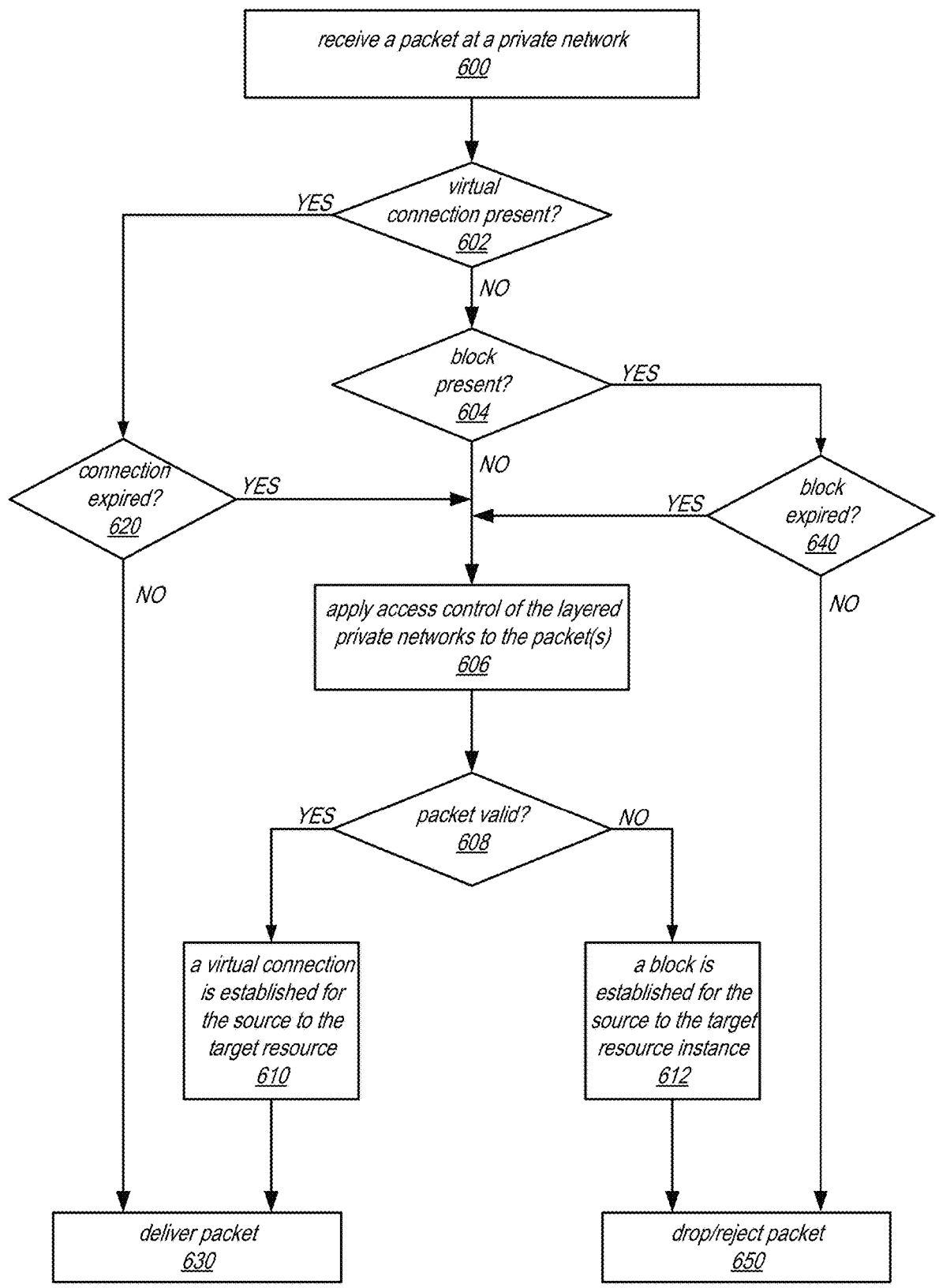
FIG. 6 is a flowchart of a method for receiving and processing packets in layered private networks in which virtual connections or blocks may be established between sources and destinations, according to at least some embodiments.

FIG. 6 is a flowchart of a method for receiving and processing packets in layered private networks in which virtual connections or blocks may be established between sources and destinations through the layered private networks, according to at least some embodiments. FIG. 6 describes a method for receiving and processing network packets (e.g., client IP packets) in layered private networks in which layered private network access control is applied to one or more initial packets from a source to a destination, for example as illustrated in FIG. 5. Based on the results, either a virtual connection between the source and destination is established, or a block for packets from the source to the destination is established, so that the access control does not have to be applied to every packet received from the source and directed to the destination. The connection or block may be expired or timed out after a period; subsequent packets from the source to the destination may be re-evaluated according to the access control rules, resulting in either a virtual connection or a block being established for the source-destination pair.

As indicated at 600 of FIG. 6, a packet may be received at a private network from an external source. For example, the packet(s) may be received at a client private network 110 as illustrated in FIGS. 1 and 2. At 602 of FIG. 6, one or more processes and/or devices on the client private network may check to see if there is a virtual connection established between the source of the packet and the indicated destination of the packet (e.g., a resource on one of the private networks in the layered private network implementation).

At 602 of FIG. 6, if a virtual connection does not exist between the source and the destination, then one or more processes and/or devices on the client private network may check to see if there is a block for the source to the destination at 604. At 604, if there is no block on the source/destination pair, then at 606 of FIG. 6 the access control rules of one or more of the private network(s) in the layered private network implementation may be applied to the packet, for example according to a method as illustrated in FIG. 5. The packet may either pass all of the applied access control rules and thus be determined to be a valid packet, or fail at least one of the access control rules and thus be determined to be an invalid packet.

At 608 of FIG. 6, if the packet passed the access control that was applied at 606 and is thus valid, then a virtual connection may be established for the source through one or more intervening private network layers to the target resource instance as indicated at 610 of FIG. 6. The valid packet is delivered to the destination resource instance, as indicated at 630 of FIG. 6. Additional packets from the source may then pass through the layered private networks to the target resource instance via the virtual connection without applying the security and access controls at the intervening private network layers. In some embodiments, establishing a virtual connection from a source to a target resource may involve establishing an overlay network tunnel according to Internet Protocol (IP) tunneling technology, for example as illustrated in FIG. 10. Note that other methods for establishing connections through the layered private networks between sources and destinations on the layered private network implementation may be used in various embodiments.

At 608 of FIG. 6, if the packet failed the access control that was applied at 606 and is thus invalid, then a block may be established for the source for packets directed to the target resource instance as indicated at 612 of FIG. 6. The invalid packet is dropped or rejected, as indicated at 650 of FIG. 6. The block may be applied to any additional packets received from the source that are directed to the resource so that the packets are summarily rejected without applying access control of the layered private networks. In some embodiments, to establish a block for a source-target pair on a layered private network implementation, a flag or rule may be set for the source-target pair at the border of the top-level client private network in the layered private network implementation that indicates that any subsequent packets from the source directed to the target resource instance can be summarily rejected without applying security and access control to the packets.

In some embodiments, the virtual connections and/or blocks between sources and destination resource instances within the layered private network implementation as described above may time out or expire after a specified period or time limit. In some embodiments, instead of or in addition to expiring after a specified period, a virtual connection or block may be terminated in response to certain events. For example, a virtual connection or block may be terminated in response to a change in the access control rules of one or more of the virtual private networks in the layered private network implementation. At 602 of FIG. 6, if there is a virtual connection between the source and the destination for a packet received at 600, and if the connection has not expired at 620 of FIG. 6, then the packet may be delivered to the destination via the virtual connection at 630 of FIG. 6 without applying access control for the intervening private network layers. If the virtual connection has expired at 620 of FIG. 6, then the packet may be processed at 606 of FIG. 6, for example according to a method as illustrated in FIG. 5, to determine if the packet is valid or invalid and either re-establish the virtual connection at 610 or establish a block 612 based on the results. At 604 of FIG. 6, if there is a block between the source and the destination for a packet received at 600, and if the block has not expired at 640 of FIG. 6, then the packet may be summarily dropped at 650 of FIG. 6 without applying the access control for the intervening private network layers. If the block has expired at 640 of FIG. 6, then the packet may be processed at 606 of FIG. 6, for example according to a method as illustrated in FIG. 5, to determine if the packet is valid or invalid and either re-establish the block at 612 or establish a virtual connection at 610 based on the results.

FIGS. 7A and 7B illustrate example access control rules for layered private networks as illustrated in FIGS. 1 through 6, according to at least some embodiments. These example rules are shown as lists of resources with corresponding indications of entities that are allowed access to the respective resources. However, note that these example rules and the format used to illustrate the rules are given as examples and are not intended to be limiting. Also note that, while the example access control rules are shown as being inclusive ("allow access by"), access control rules for a private network may be specified as either exclusive or inclusive rules, or as both, in various embodiments. In some embodiments, in addition to specifying what entities are allowed to access particular resources, the access control rules may also specify, for at least some of the resources, permissions granted to or restrictions placed on the entities when accessing the respective resources (e.g., read only, read/write, delete, copy, etc.)

FIG. 7A shows example access control rules for a client private network 110 as illustrated in FIGS. 1 and 2. Default address ranges that are allowed access to client private network 110 may be specified. Private networks 120A and 120B are sub private networks of client private network 110 and are shown as resources of client private network 110. Client private network 110's access control rules for private network 120A are set to default rules, for example indicating that any entity that is allowed access to client private network 110 is allowed (by client private network 110) to access sub private network 120A. Client private network 110's access control rules for private network 120B only allow access from client network 180; other external entities are not allowed access to private network 120B. Client private network 110's access control rules for resource 112A are set to default, for example indicating that any entity that is allowed access to client private network 110, including resources on private networks 120A and 120B, can access resource 112A. Client private network 110's access control rules allow access to resource 112B only from specified client network 180 addresses and from private network 120A.

FIG. 7B shows example access control rules for private network 120A as illustrated in FIGS. 1 and 2. Default address ranges that are allowed access to private network 120A may be specified. Private network 130 is a sub private network of private network 120A and is shown as a resource of private network 120A. Private network 120A's access control rules for private network 130 are set to the default for private network 120A, for example indicating that any entity that is allowed access to private network 120A is allowed (by private network 120A) to access sub private network 130. Private network 120A's access control rules for resource 122A1 allow access only from specified addresses of client network 180 and from specified addresses of private network 120B. Private network 120A's access control rules for resources 122A2 through 122A10 are set to the default for private network 120A. Private network 120A's access control rules for resource 122A11 allow access only from specified addresses of client network 180, from private network 120B, and from specified addresses of its parent private network (client private network 110).

Figure 8:
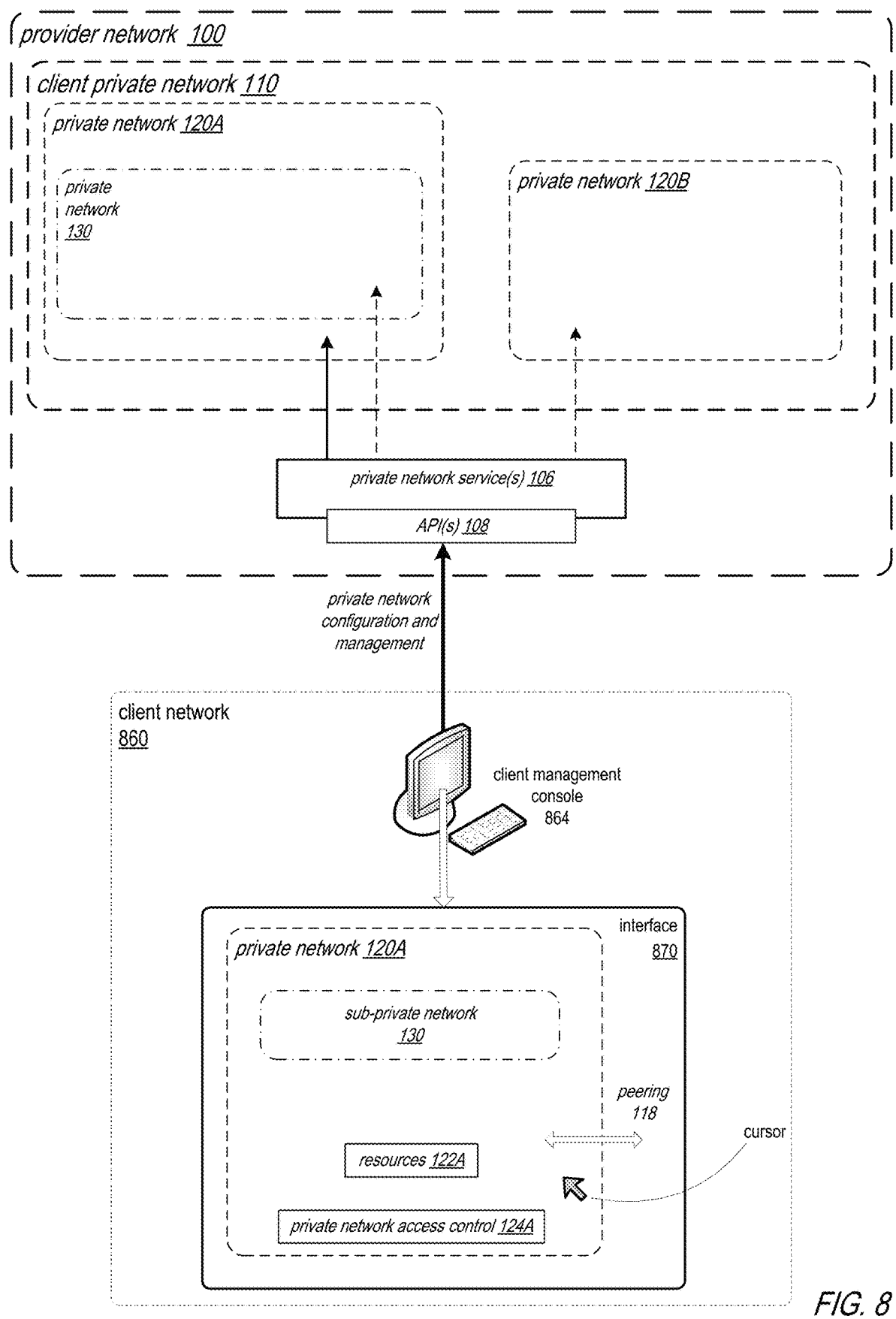
FIG. 8 illustrates a private network service and application programming interface (API) in a provider network environment, according to at least some embodiments.

FIG. 8 illustrates a private network service and API in a provider network environment, according to at least some embodiments. The private network service and API may, for example, be used to establish, configure, and provision a layered private network topology as illustrated in FIGS. 1 and 2. Clients associated with client network 860 may establish, provision, and manage layered private networks on provider network 100 via one or more private network services 106 of the provider network 100 accessed through management console(s) 864 on client network 860. Clients may access API(s) 108 of private network service(s) 106 via management console 864 to establish and manage layered private networks on the provider network 100. In at least some embodiments, the API(s) 108 may display an interface 870 on console 864 that provides one or more graphical and/or textual interface elements that allow clients to view, create, provision, and manage layered private networks on the provider network 100. To facilitate the establishment of a layered private network topology on the provider network 100, the API(s) 108 may provide to the clients, via the interface elements of interface 870, one or more of, but not limited to, the following capabilities:

Create and provision client-level private networks (e.g., client private network 110).

Create and provision sub private networks as resources within parent private networks (e.g., private networks 120A and 120B within client private network 110).

Create, manage, and modify access control rules for the private networks and for resources within the private networks, including sub private networks.

Create and manage peerings between sub private networks through their parent private network.

FIG. 8 shows a non-limiting example of a graphical and/or textual interface 870 that may be displayed at a client's console 864. The interface 870 may show a graphical and/or textual representation of a particular private network. In this example, a representation of private network 120A is shown. Graphical and/or textual representations of one or more resources 122A in the private network, including but not limited to representations of sub private networks (e.g., sub private network 130), may be displayed. Graphical and/or textual representations of network elements, security and access control components or elements (e.g., security groups and subnets as illustrated in FIGS. 12 and 13), and other private network components may be displayed. Graphical and/or textual representations of security and access control rules (e.g., private network access control 124A rules, for example as illustrated in FIG. 7B) may be displayed.

A client may, for example, use a cursor control device to select various interface elements provided by interface 870 to, for example, create and provision client-level private networks (e.g., client private network 110), create and provision sub private networks as resources within parent private networks (e.g., private networks 120A and 120B within client private network 110, or private network 130 within private network 120A), create, manage, and modify access control rules (e.g., access control 124A rules) for the private networks and for resources within the private networks, including sub private networks, and create and manage peerings 118 between sub private networks through their parent private network. The interface 870 may include other user interface elements, for example menu or other elements that allow the client to select from among various ones of the client's private networks, elements to select, create, configure, and manage resources within private networks, and so on.

In some embodiments, instead of or in addition to providing a graphical interface via console 864, a provider network may provide a command line interface (CLI) to the private network services 106 via which a client may establish and manage a layered private network topology. For example, in some embodiments, the client may create and provision client-level private networks via CLI commands, create and provision sub private networks as resources within parent private networks via CLI commands, create, manage, and modify access control rules for the private networks and for resources within the private networks via CLI commands, and create and manage peerings between sub private networks through their parent private network via CLI commands.

Example Provider Network Environments

This section describes example provider network environments in which embodiments of the methods and apparatus for private network layering as described in reference to FIGS. 1 through 8 may be implemented. However, these example provider network environments are not intended to be limiting.

Figure 9:
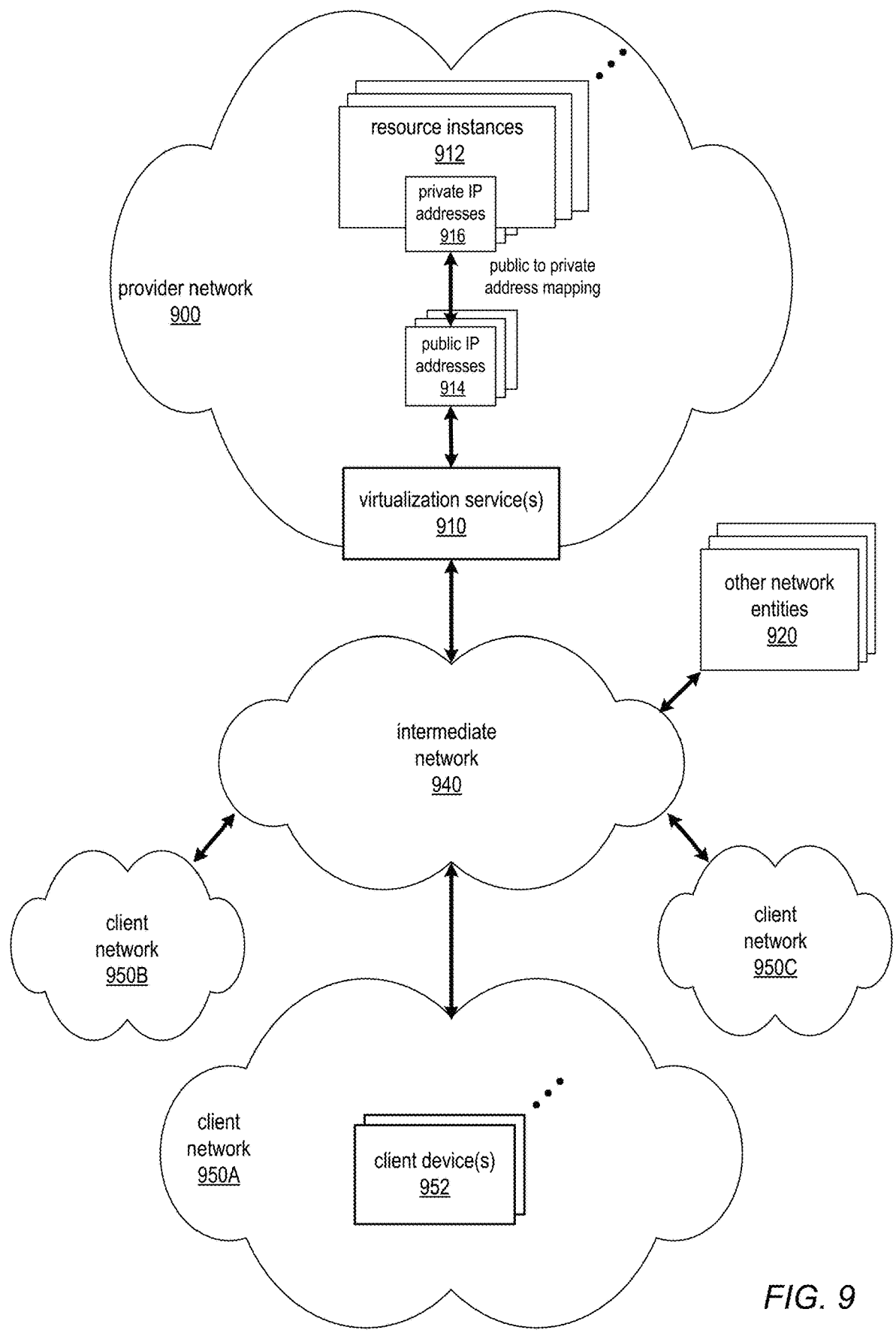
FIG. 9 illustrates an example provider network environment, according to at least some embodiments.

FIG. 9 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

FIG. 10 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

FIG. 11 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

FIG. 12 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 12 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 12 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

FIG. 13 illustrates subnets and security groups in an example virtual private network implementation on a provider network, according to at least some embodiments. In at least some embodiments, a provider network such as provider network 1200 in FIG. 12 may allow the client to establish and manage virtual security groups 1316 within the client's virtual private network 1310, within or across subnets 1314. A security group 1316 acts as a virtual firewall that controls the traffic allowed to reach one or more resource instances 1318 within the security group 1316. The client may establish one or more security groups 1316 within the private network 1310, and may associate each resource instance 1318 in the private network 1310 with one or more of the security groups 1316. In at least some embodiments, the client may establish and/or modify rules for each security group 1316 that control the inbound traffic allowed to reach the resource instances 1318 associated with the security group 1316.

In the example virtual private network 1310 shown in FIG. 13, the private network 1310 is subdivided into two subnets 1314A and 1314B. Access to the private network 1310 is controlled by gateway(s) 1330. Each subnet 1314 may include at least one router 1312 that acts to route traffic to (and from) resource instances 1318 on the respective subnet 1314. In some embodiments, network access control lists (ACLs) may be used to control access to the subnets 1314 at router(s) 1312. In the example shown in FIG. 13, resource instances 1318A through 1318E are on subnet 1314A, and resource instances 1318F through 1318J are on subnet 1314B. The client has established four security groups 1316A through 1316D. As shown in FIG. 13, a security group may extend across subnets 1314, as does security group 1316A that includes resource instances 1318A and 1318B on subnet 1314A and resource instance 1318F on subnet 1314B. In addition, a resource instance 1318 may be included in two or more security groups 1316, as is resource instance 1318A which is included in security group 1316A and 1316B.

Illustrative System

Figure 14:
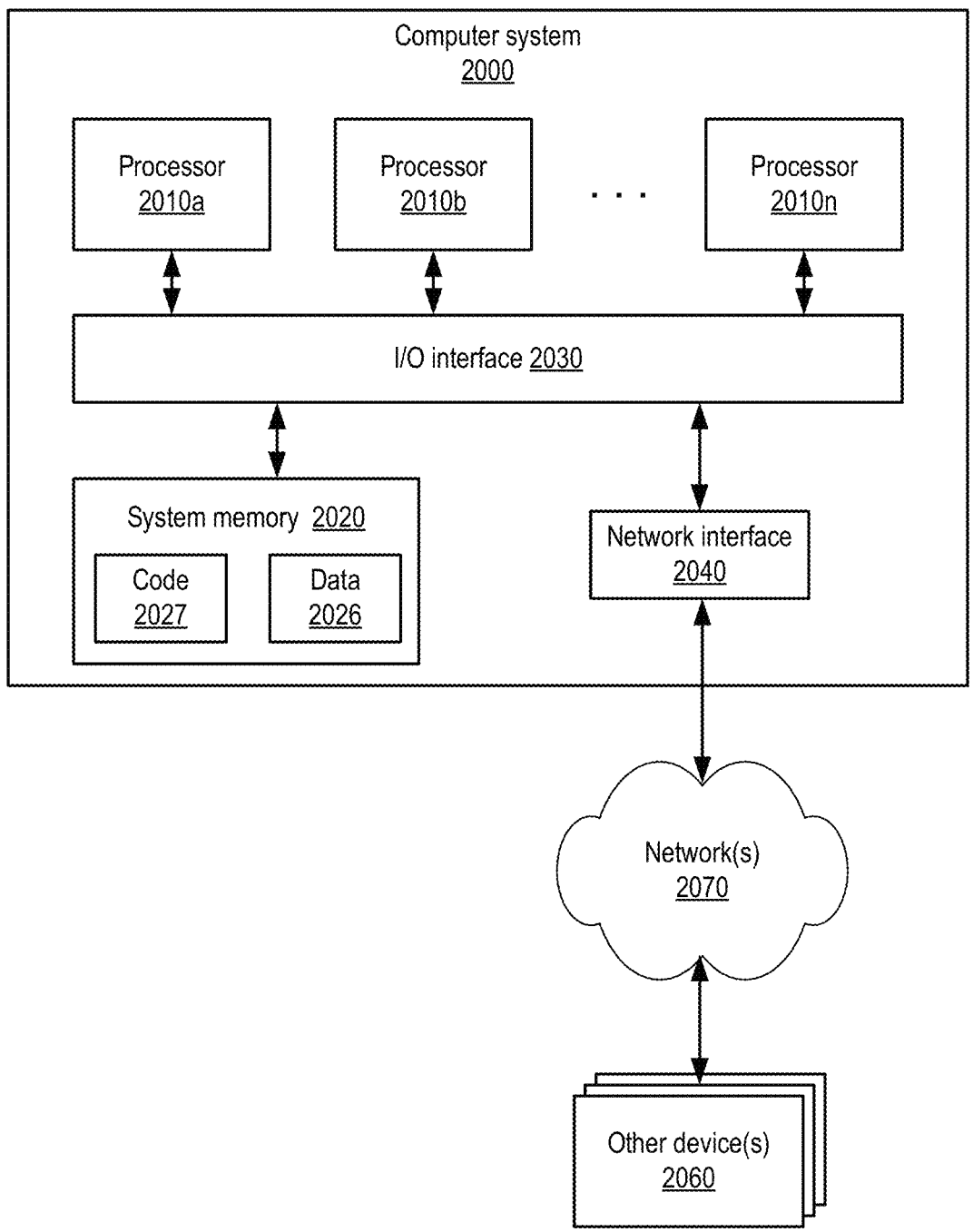
FIG. 14 is a block diagram illustrating an example computer system that may be used in some embodiments.

In at least some embodiments, a server that implements a portion or all of the methods and apparatus for private network layering in provider network environments as described herein may include a general-purpose computer system that includes or is configured to access one or more computer-accessible media, such as computer system 2000 illustrated in FIG. 14. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for private network layering in provider network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 13, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 13 for implementing embodiments of private network layering in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A provider network, comprising:
   one or more computing devices, comprising one or more processors and memory, implementing a private network service and an application programming interface (API) to the private network service, configured to:
   receive input from a client of the provider network via the API to implement access control rules for a parent private network within the provider network, wherein the parent private network is configured to apply the access control rules to received network packets to determine that the network packets are from one or more sources that have access to resources of the parent private network;
   receive input from a same or different client of the provider network via the API to implement access control rules on a sub private network within the parent private network, wherein the sub private network, that is within the parent private network within the provider network, is configured to apply the access control rules of the sub private network to one or more network packets received by the sub private network, to determine that the one or more network packets are from a source that has access to resources of the sub private network, wherein the sub private network applies one or more different access control rules to the one or more network packets received by the sub private network, than applied for the parent private network to the network packets received by the parent private network, to restrict access to the resources of the sub private network from other resources within the parent private network or from entities external to the parent private network; and
   wherein the source is not granted access to the resources of the sub private network without satisfying both the parent private network access control rules applied by the parent private network and the sub private network access control rules applied by the sub private network.

2. The private network service as recited in claim 1, wherein the parent private network is further configured to allow access to the resources of the parent private network from the sub private network.

3. The private network service as recited in claim 1, wherein the parent private network is further configured to restrict access to the resources of the parent private network from the sub private network.

4. The private network service as recited in claim 1, wherein the sub private network is further configured to restrict access to the resources of the sub private network from the parent private network.

5. The private network service as recited in claim 1, wherein the sub private network is configured to allow access to at least one resource of the sub private network from the parent private network.

6. The private network service as recited in claim 1, wherein the sub private network is configured to allow access to at least one resource of the sub private network from at least one other sub private network within the parent private network.

7. The private network service as recited in claim 1, wherein the parent private network is configured to restrict access to at least one resource of the sub private network from at least one other sub private network within the parent private network.

8. The private network service as recited in claim 1, wherein the sub private network and one other sub private network within the parent private network are configured to share one or more of the resources of the parent private network.

9. The private network service as recited in claim 1, wherein the parent private network is implemented as a resource of another private network on the provider network, wherein the other private network is configured to control access to the parent private network by entities external to the other private network.

10. The private network service as recited in claim 1, wherein to implement access control rules on the sub private network, the private network service is further configured to:
   implement initial default access control rules for the sub private network; and
   modify the initial default access control rules on the sub private network according to additional input obtained from the same or different client of the provider network via the API.

11. The provider network as recited in claim 1, wherein the parent private network is a client private network established and owned by a client of the provider network, and wherein the sub private network is established and owned by a different entity than the client.

12. A method, comprising:
   receiving input from a client of a provider network via an application programming interface (API) to implement access control rules for a parent private network within the provider network, wherein the parent private network applies the access control rules to received network packets to determine that the network packets are from one or more sources that have access to resources of the parent private network;
   receiving input obtained from a same or different client of the provider network via the API to implement access control rules on a sub private network within the parent private network, wherein the sub private network, that is within the parent private network within the provider network, applies the access control rules of the sub private network to one or more network packets received by the sub private network, to determine that the one or more network packets are from a source that has access to resources of the sub private network, wherein the sub private network applies one or more different access control rules to the one or more network packets received by the sub private network, than applied for the parent private network to the network packets received by the parent private network, to restrict access to the resources of the sub private network from other resources within the parent private network or from entities external to the parent private network; and
   wherein the source is not granted access to the resources of the sub private network without satisfying both the parent private network access control rules applied by the parent private network and the sub private network access control rules applied by the sub private network.

13. The method as recited in claim 12, wherein the one or more network packets from the source are targeted at a particular resource of the sub private network, the method further comprising:
   in response to determining that the one or more network packets are from a source that has access to the particular resource of the sub private network, establishing a virtual connection from the source to the particular resource of the sub private network through the parent private network;
   receiving, at the parent private network, additional network packets from the source that are targeted at the particular resource of the sub private network;
   sending the additional network packets to the particular resource of the sub private network via the virtual connection without applying the access control rules of the parent private network or of the sub private network to the additional network packets.

14. The method as recited in claim 13, further comprising expiring the virtual connection after a specified period.

15. The method as recited in claim 12, further comprising dropping at least one network packet that is determined to be from a source that does not have access to the resources of the parent private network according to the parent private network's access control rules or that is determined to be from a source that does not have access to the sub private network according to the sub private network's access control rules.

16. The method as recited in claim 12, further comprising:
   determining at least one packet that is from a source that does not have access to a target resource according to the parent private network's access control rules or the sub private network's access control rules;
   establishing a block for packets from the source to the target resource;
   rejecting one or more additional packets from the source that are directed to the target resource according to the block; and
   expiring the block after a specified period.

17. The method as recited in claim 12, further comprising:
   determining at least one network packet that is targeted at a resource of the parent private network; and
   sending the at least one network packet to the resource over the parent private network.

18. The method as recited in claim 12, further comprising:
   determining, by the parent private network, that one or more of the network packets are targeted at the sub private network; and
   applying, by the parent private network, the sub private network access control rules to the network packets to determine that the network packets are from sources that have access to the sub private network.

19. The method as recited in claim 12, wherein the parent private network is implemented as a resource of another private network on the provider network, wherein the network packets are received from the one or more sources via the other private network.

20. One or more non-transitory computer-readable storage media storing program instructions that when executed on or across one or more processors cause the one or more processors to implement a private network service in a provider network, the private network service configured to:
   provide an application programming interface (API) to clients of the provider network;
   receive input obtained from a client of the provider network via the API to implement access control rules for a parent private network within the provider network, wherein the parent private network, is configured to apply the access control rules to received network packets to determine that the network packets are from one or more sources that have access to resources of the parent private network;

receive input obtained from a same or different client of the provider network via the API to implement access control rules on a sub private network within the parent private network, wherein the sub private network, that is within the parent private network within the provider network, is configured to apply the access control rules of the sub private network to one or more network packets received by the sub private network, to determine that the one or more network packets are from a source that has access to resources of the sub private network, wherein the sub private network applies one or more different access control rules to the one or more network packets received by the sub private network, than applied for the parent private network to the network packets received by the parent private network, to restrict access to the resources of the sub private network from other resources within the parent private network or from entities external to the parent private network; and wherein the source is not granted access to the resources of the sub private network without satisfying both the parent private network access control rules applied by the parent private network and the sub private network access control rules applied by the sub private network.

* * * * *